United States Patent
Yamaguchi et al.

(10) Patent No.: US 6,400,392 B1
(45) Date of Patent: *Jun. 4, 2002

(54) VIDEO INFORMATION ADJUSTING APPARATUS, VIDEO INFORMATION TRANSMITTING APPARATUS AND VIDEO INFORMATION RECEIVING APPARATUS

(75) Inventors: Takao Yamaguchi, Sakai; Akira Fukumoto, Hirakata, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/632,719

(22) Filed: Apr. 10, 1996

(30) Foreign Application Priority Data

Apr. 11, 1995 (JP) ............................................. 7-139845

(51) Int. Cl.[7] .......................... H04N 7/14; H04N 5/232; H04N 5/235
(52) U.S. Cl. ................................ 348/14.12; 348/14.08; 348/362; 348/211
(58) Field of Search ................................ 348/211, 362, 348/370, 143, 14.08, 14.01, 14.14, 14.12, 14.05

(56) References Cited

U.S. PATENT DOCUMENTS

| | | | | |
|---|---|---|---|---|
| 5,144,442 A | * | 9/1992 | Ginosar et al. ............. 348/362 |
| 5,162,914 A | * | 11/1992 | Takahashi et al. ..... 358/213.19 |
| 5,264,944 A | * | 11/1993 | Takemura .................... 358/335 |
| 5,309,243 A | * | 5/1994 | Tsai ........................... 348/362 |
| 5,376,964 A | * | 12/1994 | Soga et al. .................. 348/229 |
| 5,436,662 A | | 7/1995 | Nagasaki et al. |
| 5,572,256 A | | 11/1996 | Egawa et al. |
| 5,648,814 A | * | 7/1997 | Munson ........................ 348/15 |
| 5,663,761 A | * | 9/1997 | Fukui .......................... 348/323 |
| 5,838,368 A | * | 11/1998 | Masunaga et al. .......... 348/211 |

FOREIGN PATENT DOCUMENTS

| | | | |
|---|---|---|---|
| EP | 0 630 151 | 12/1994 | |
| JP | 5-145887 | * 6/1993 | ............ H04N/5/30 |
| JP | 7-87402 | 3/1995 | |

OTHER PUBLICATIONS

European Search Report corresponding to application No. EP 96 10 5726 dated Mar. 15, 1999.

* cited by examiner

Primary Examiner—Wendy R. Garber
Assistant Examiner—Jacqueline Wilson
(74) Attorney, Agent, or Firm—Ratner & Prestia

(57) ABSTRACT

A video information adjusting apparatus includes illuminance information acquiring part 511 for separately acquiring image information corresponding at least to two different kinds of illuminance ranges, from an identical shot on the basis of a prescribed imaging condition, transmitting part 504 for separately transmitting out the image information corresponding at least to the two kinds of illuminance ranges, and for receiving other image information corresponding at least to two different kinds of illuminance ranges-from outside, and illuminance information adjusting part 512 for generating brightness-adjusted image information on the basis of a prescribed illuminance range and by using all or part of the other image information corresponding at least to the two kinds of illuminance ranges. According to the video information adjusting apparatus, the image information which is transmitted out can be adjusted at each receiving side.

7 Claims, 29 Drawing Sheets

Fig. 1 (1)
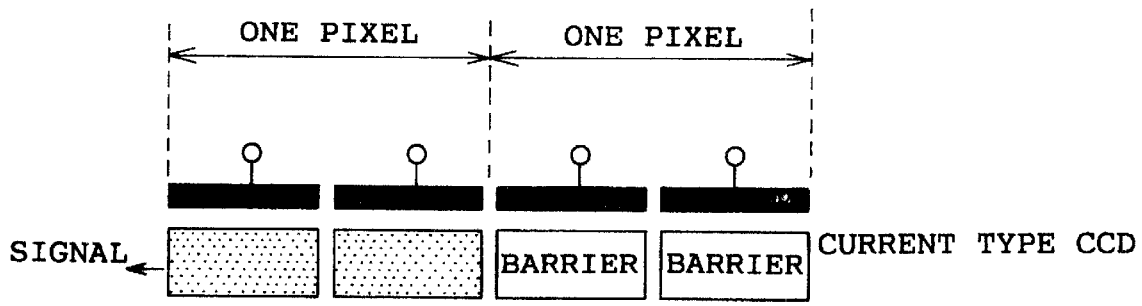
Fig. 1 (2)
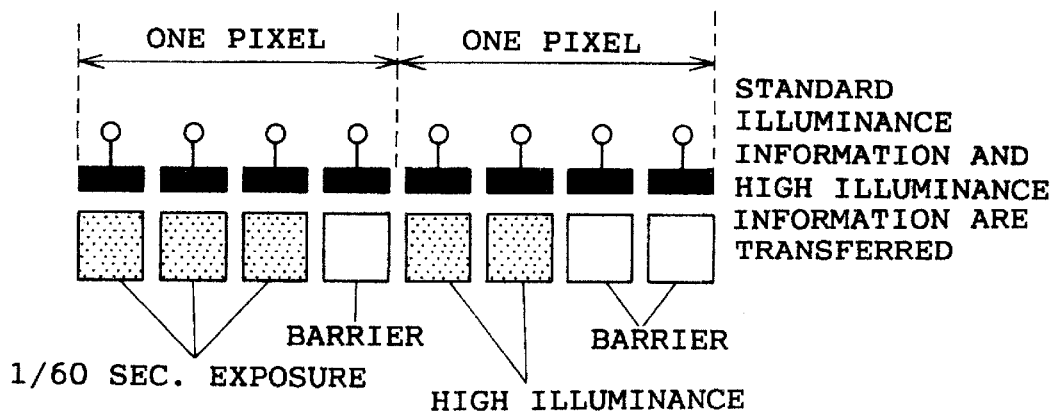
Fig. 1 (3)
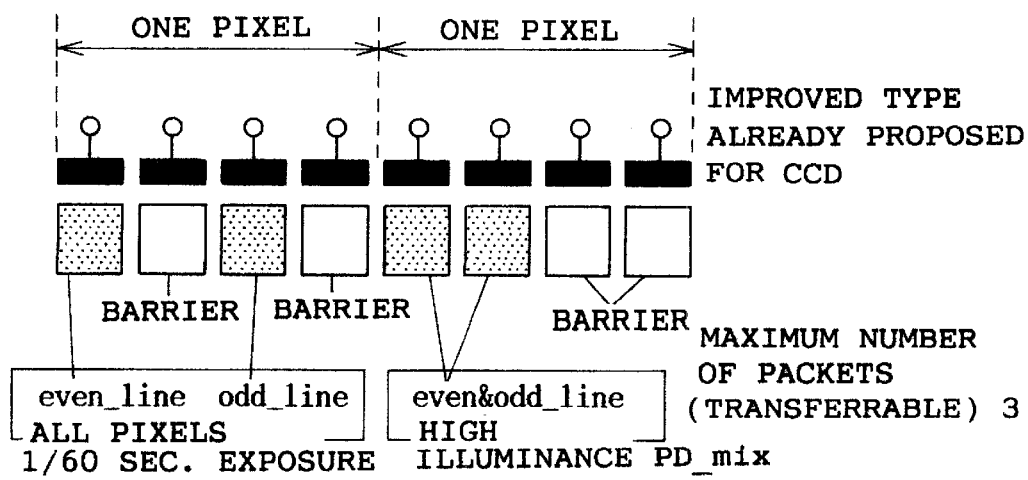

EXAMPLE OF IMAGING
COMPOSING IMAGE FROM HIGH ILLUMINANCE IMAGE
(ACCUMULATION TIME: 1/1000 SEC.) AND
STANDARD ILLUMINANCE IMAGE
(ACCUMULATION TIME: 1/60 SEC.) BY
ADDING BRIGHTNESS ON PIXEL-BY-PIXEL BASIS

Fig. 5
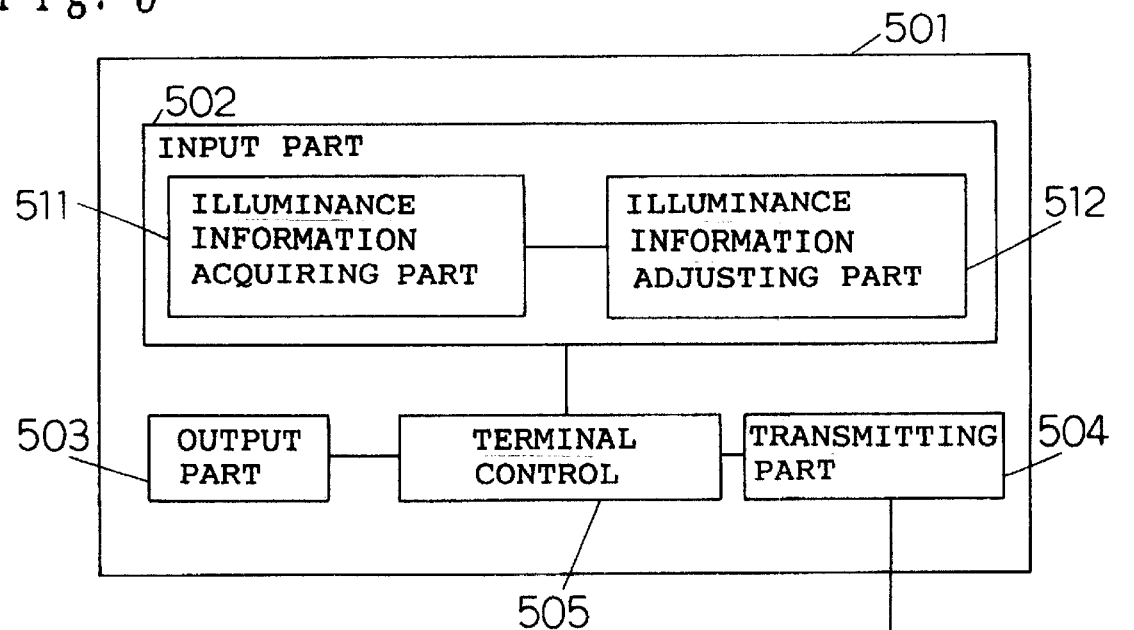
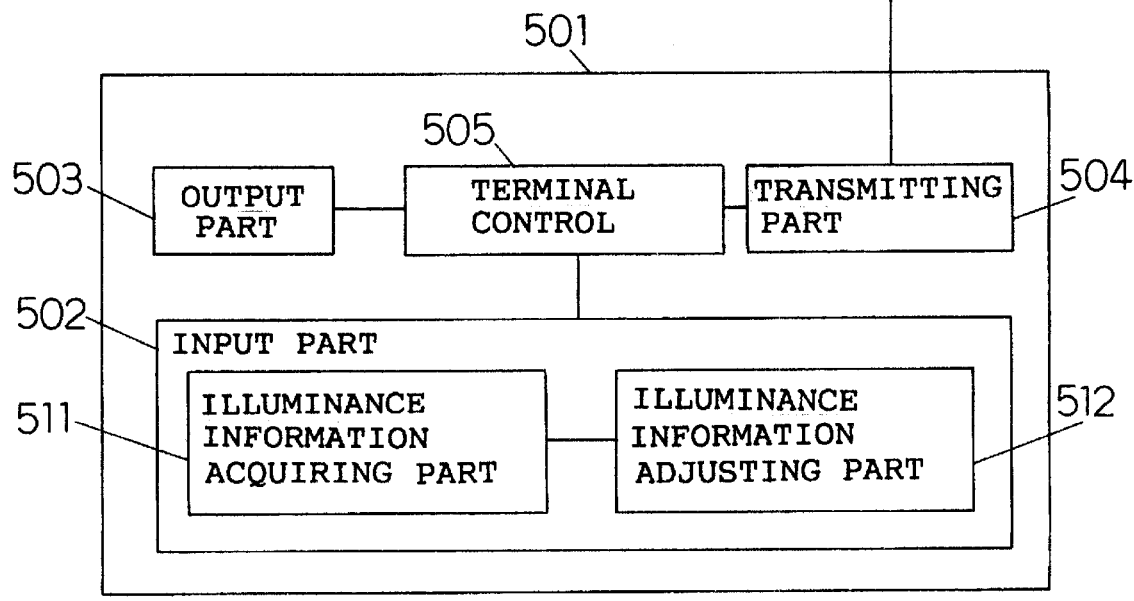

*OTHERS INCLUDE MACHINE LOAD AND NETWORK LOAD.

Fig. 19

| VOICE BLOCK | ORIGINATOR | START TIME | VOICE BLOCK LENGTH (SEC.) |
|---|---|---|---|
| No.1 | Yamaguchi | 12 HR. 15 MIN. 10 SEC. | 15 |
| No.2 | Okamoto | 12 HR. 15 MIN. 20 SEC. | 60 |
| No.3 | Hamada | 12 HR. 16 MIN. 00 SEC. | 20 |
| No.4 | Yamaguchi | 12 HR. 16 MIN. 05 SEC. | 30 |
| No.5 | Okamoto | 12 HR. 17 MIN. 00 SEC. | 40 |
| ‥ | ‥ | ‥ | ‥ |

Fig. 20

| EVENT | EVENT ORIGINATOR | TIME | LOCATION |
|---|---|---|---|
| VIDEO SCENE CHANGE | Yamaguchi | 5/3 18:03 | DOCUMENT PICKUP CAMERA |
| USER ABSENT | Okamoto | 5/3 18:01 | PERSON PICKUP CAMERA |
| VIDEO SCENE CHANGE | Hamada | 5/3 18:02 | DOCUMENT PICKUP CAMERA |
| USER PRESENT | Hamada | 5/4 12:00 | PERSON PICKUP CAMERA |
| .. | .. | .. | .. |
| .. | .. | .. | .. |
| .. | .. | .. | .. |

Fig. 21

| EVENT | EVENT ORIGINATOR | TIME | LOCATION |
|---|---|---|---|
| ZOOM IN | Yamaguchi | 5/3 18:03 | DOCUMENT PICKUP CAMERA |
| FOCUS NEAR | Okamoto | 5/3 18:01 | PERSON PICKUP CAMERA |
| FOCUS FAR | Hamada | 5/3 18:02 | DOCUMENT PICKUP CAMERA |
| ZOOM OUT | Hamada | 5/4 12:00 | PERSON PICKUP CAMERA |
| VIDEO CHANNEL CHANGE | Yamaguchi | 5/4 12:01 | FROM DOCUMENT PICKUP CAMERA TO FILE VIDEO |
| VIDEO CHANNEL CHANGE | Okamoto | 5/4 13:00 | FROM DOCUMENT PICKUP CAMERA TO PERSON PICKUP CAMERA |
| .. | .. | .. | .. |

Fig. 22

| EVENT | EVENT ORIGINATOR | TIME | LOCATION |
|---|---|---|---|
| POINTING BY MOUSE POINTER | Yamaguchi | 5/3 18:00 | DOCUMENT NO.1, CHAPTER 1 |
| POINTING ON TOUCH PANEL SCREEN | Okamoto | 5/3 18:01 | DOCUMENT NO.1, CHAPTER 1 |
| POINTING ON SCREEN BY LIGHT PEN | Hamada | 5/3 18:02 | DOCUMENT NO.2, CHAPTER 3 |
| WINDOW CREATION | Hamada | 5/4 12:00 | DOCUMENT NO.1, CHAPTER 1 |
| WINDOW OPEN | Yamaguchi | 5/4 12:01 | DOCUMENT NO.1, CHAPTER 1 |
| WINDOW CLOSE | Okamoto | 5/4 13:00 | DOCUMENT NO.2, CHAPTER 3 |
| WINDOW DELETE | Yamaguchi | 5/4 13:05 | DOCUMENT NO.2, CHAPTER 3 |
| WRITING MEMO TO DOCUMENT | Yamaguchi | 5/4 13:02 | DOCUMENT NO.2, CHAPTER 3 |
| : | : | : | : |

VIDEO INFORMATION ADJUSTING APPARATUS, VIDEO INFORMATION TRANSMITTING APPARATUS AND VIDEO INFORMATION RECEIVING APPARATUS

BACKGROUND OF THE INVENTION

1. Field of the Invention

The present invention relates to a video information transmitting apparatus, video information receiving apparatus and video information adjusting apparatus that automatically adjusts the resolution and brightness of video information, for example, according to a user's condition in a telecommunication system, and thereby achieves efficient utilization of computer resources.

2. Related Art of the Invention

Videotelephones and videoconferencing systems are examples of means of telecommunications that enable persons in remote locations to exchange larger volumes of information between them. In such systems, when shooting a document or the like to be presented to the other party and the expressions of a participant at the transmitting end for transmission, the iris of the camera used for shooting, the shooting environment, etc. are adjusted at the transmitting end.

Many systems have been proposed or put to practical implementation, including multimedia conferencing systems, that are capable of presenting documents and the expressions of conference participants by using a plurality of full-motion windows (windows for displaying moving images).

Such systems enable conferences to be conducted among people in remote locations by displaying the expressions of conference participants and documents to be presented to the participants in a plurality of full-motion windows.

In videotelephones and videoconferencing systems, however, when shooting a person located near a window or a document to be presented to the other party, the transmitting party has to adjust the iris of the camera, etc. by considering the receiving conditions at the receiving end.

Furthermore, in a multimedia conferencing system, participants do not always need to view all the full-motion windows displayed.

In this way, in the previous video information transmission systems, since transmission is performed without considering user conditions, any video information is transmitted in the same way regardless of whether the user's attention is focused on it or not, and it has been found that this presents a problem in terms of efficient utilization of computer resources.

SUMMARY OF THE INVENTION

The present invention performs the adjustment of illuminance information and/or image resolution by using an improved type CCD (solid-state imaging device) described in a previous patent application filed by the present inventor. The improved type CCD means that an improvement is made in the amount of charge transfer in a CCD.

The improved type CCD will be described below.

FIG. 1 is a diagram schematically showing the structure of the improved type CCD by comparison with the structure of the current type. As shown in FIG. 1(1), in the current type CCD, four transfer gates are used for two pixels, so that a signal of only one packet can be transferred for two pixels.

On the other hand, the improved type CCD employs a 2-pixel, 8-gate configuration, as shown in FIG. 1(2) or (3). This configuration allows a signal of a maximum of three packets to be transferred for one pixel. Japanese, Application No. 5-145887 is incorporated herein by reference.

By increasing the number of transfer packets, as shown in FIG. 1(2), signals of two different accumulation periods (for example, different shutter speeds such as $\frac{1}{60}$ [sec] and $\frac{1}{1000}$ [sec]) can be read out separately, and by combining these, signals of wider dynamic range can be handled.

NTSC resolution is obtained by mixing photodiode (PD) signals of even-numbered lines and odd-numbered lines. It is already known that if these two kinds of signals are handled separately rather than mixing them together, image resolution can be increased by about 30% (Ishigami, et al., "½-inch, 380,000-pixel Whole-Image Readout CCD Imager," Technical Report, The Institute of Television Engineers, Vol. 17, No. 16, pp. 39–44 (1993)). This report is incorporated herein by reference.

Therefore, by using the improved type CCD, image resolution can be adjusted according to the situation. If these two resolutions are switched according to the situation, high-resolution images can be obtained without unnecessarily using computer resources (such as network and storage capacities).

FIG. 2 is a diagram showing how subjects of different illuminance levels are imaged by the improved type CCD by comparison with the current type CCD. In the current type CCD, the dynamic range is narrow, and depending on the subject, the outside background may appear "white out" or the room interior may appear "black out".

Therefore, in the current type CCD, the range of illuminance for shooting must be adjusted by using a mechanical iris while viewing the image currently being shot, or by controlling the signal accumulation time by using an electronic shutter.

On the other hand, with the improved type CCD, which has a wide dynamic range, the phenomena of "white out" and "black out" do not occur.

FIG. 3 is a diagram showing the performance of the improved type CCD. In the improved type CCD, when signals of different accumulation times, such as $\frac{1}{60}$ [sec] and $\frac{1}{1000}$ [sec], are read independently of each other, as earlier described, the dynamic range of the CCD increases by a factor of more than 13. Further, if the shutter speed is changed to $\frac{1}{100,000}$ [sec], the photodiode saturation level increases by a factor of more than 1,300 compared to the prior known type.

FIG. 4 shows images captured using the improved type CCD. The accumulation time is $\frac{1}{1,000}$ [sec] for a high illuminance image and $\frac{1}{60}$ [sec] for a standard illuminance image. When the current type CCD is used, both a light bulb and a can having different illuminance levels cannot be presented clearly; on the other hand, when the improved type CCD is used both the character on the can and the character on the light bulb can be presented.

It is therefore an object of the present invention to provide a video information adjusting apparatus that achieves efficient utilization of computer resources by adjusting the resolution and/or brightness of video information, primarily by using the improved type CCD.

To achieve the above objects, the invention provides a video information adjusting apparatus comprising image information acquiring means for separately acquiring image information corresponding at least to two different kinds of illuminance ranges, from an identical shot on the basis of a prescribed imaging condition, and image information generating means for generating brightness-adjusted image information on the basis of a prescribed illuminance range and by using all or part of the image information corresponding at least to the two kinds of illuminance ranges.

Further, to achieve the above objects, the invention provides a video information transmitting apparatus comprising image information acquiring means for separately acquiring image information corresponding at least to two different kinds of illuminance ranges, from an identical shot on the basis of a prescribed imaging condition, and transmitting means for separately transmitting out the image information corresponding at least to the two kinds of illuminance ranges.

More, to achieve the above objects, the invention provides a video information receiving apparatus comprising transmitting means for separately receiving image information corresponding at least to two different kinds of illuminance ranges from outside, and image information generating means for generating brightness-adjusted image information on the basis of a prescribed illuminance range and by using all or part of the image information corresponding at least to the two kinds of illuminance ranges.

Furthermore, to achieve the above objects, the invention provides a video information adjusting apparatus comprising image information acquiring means for separately acquiring image information corresponding at least to two different kinds of illuminance ranges, from an identical shot on the basis of a prescribed imaging condition, transmitting means for separately transmitting out the image information corresponding at least to the two kinds of illuminance ranges, and for receiving other image information corresponding at least to two different kinds of illuminance ranges from outside, and image information generating means for generating brightness-adjusted image information on the basis of a prescribed illuminance range and by using all or part of the other image information corresponding at least to the two kinds of illuminance ranges.

Further, to achieve the above objects, the invention provides a video information adjusting apparatus comprising image information acquiring means for separately acquiring image information of even-numbered lines and image information of odd-numbered lines on a field-by-field basis on the basis of a prescribed imaging condition, transmitting means for receiving information concerning prescribed resolution from outside, and image information generating means for generating image information corresponding to the prescribed resolution by using all or part of the image information of even-numbered lines and the image information of odd-numbered lines.

More, to achieve the above objects, the invention provides a video information transmitting apparatus comprising image information acquiring means for separately acquiring image information of even-numbered lines and image information of odd-numbered lines on a field-by-field basis on the basis of a prescribed imaging condition, and transmitting means for transmitting out the image information of even-numbered lines and the image information of odd-numbered lines separately.

Furthermore, to achieve the above objects, the invention provides a video information receiving apparatus comprising transmitting means for separately receiving image information of even-numbered lines and image information of odd-numbered lines on a field-by-field basis from outside, and for receiving information concerning prescribed resolution from outside, and image information generating means for generating image information corresponding to the prescribed resolution by using all or part of the image information of even-numbered lines and the image information of odd-numbered lines.

Moreover, to achieve the above objects, the invention provides a video information adjusting apparatus comprising image information acquiring means for separately acquiring image information of even-numbered lines and image information of odd-numbered lines on a field-by-field basis on the basis of a prescribed imaging condition, transmitting means for separately transmitting out the image information of even-numbered lines and the image information of odd-numbered lines, and for separately receiving other image information of even-numbered lines and other image information of odd-numbered lines from outside and also receiving information concerning prescribed resolution from outside, and image information generating means for generating image information corresponding to the prescribed resolution by using all or part of the other image information of even-numbered lines and the other image information of odd-numbered lines.

BRIEF DESCRIPTION OF THE DRAWINGS

These and other objects, advantages, features, and uses will become more apparent as the description proceeds, when considered with the accompanying drawings in which:

FIG. 1 is a diagram schematically showing the structure of an improved type CCD by comparison with a current type CCD;

FIG. 5 is a diagram showing the configuration of a video information adjusting apparatus according to a first embodiment of the present invention;

FIG. 19 is a chart showing an example of information managed in the audio information managing part 1415;

FIG. 20 is a chart showing an example of information managed in the video information managing part 1414;

FIG. 21 is a chart showing an example of information managed in the video information managing part 1414;

FIG. 22 is a chart showing an example of information managed in the window information managing part 1416 and pointing information managing part 1417;

DESCRIPTION OF THE PREFERRED EMBODIMENTS

Embodiment 1

Figure 2:
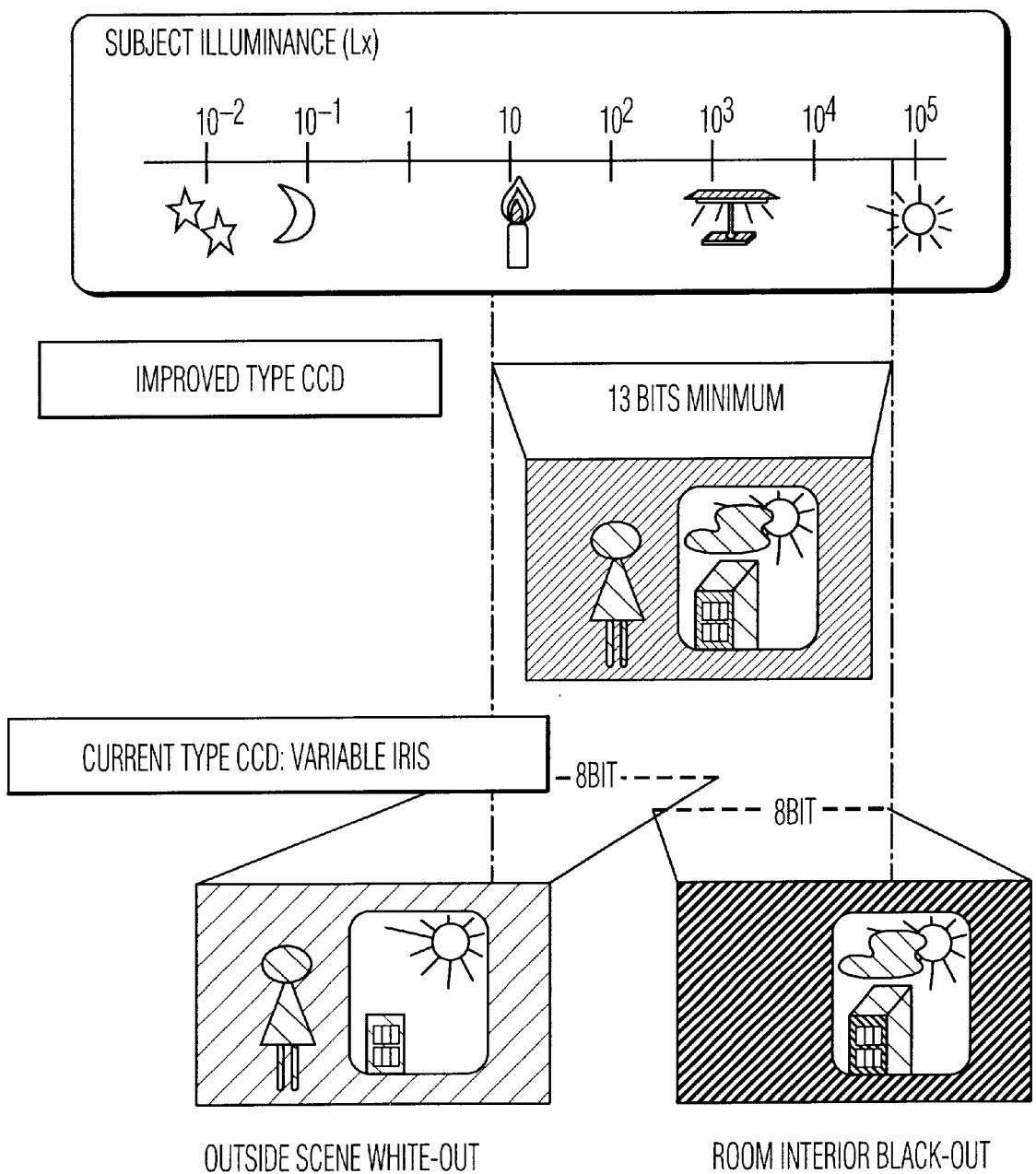
FIG. 2 is a diagram showing how subjects of different illuminance levels are imaged using the improved type CCD by comparison with the current type CCD.
Figure 3:
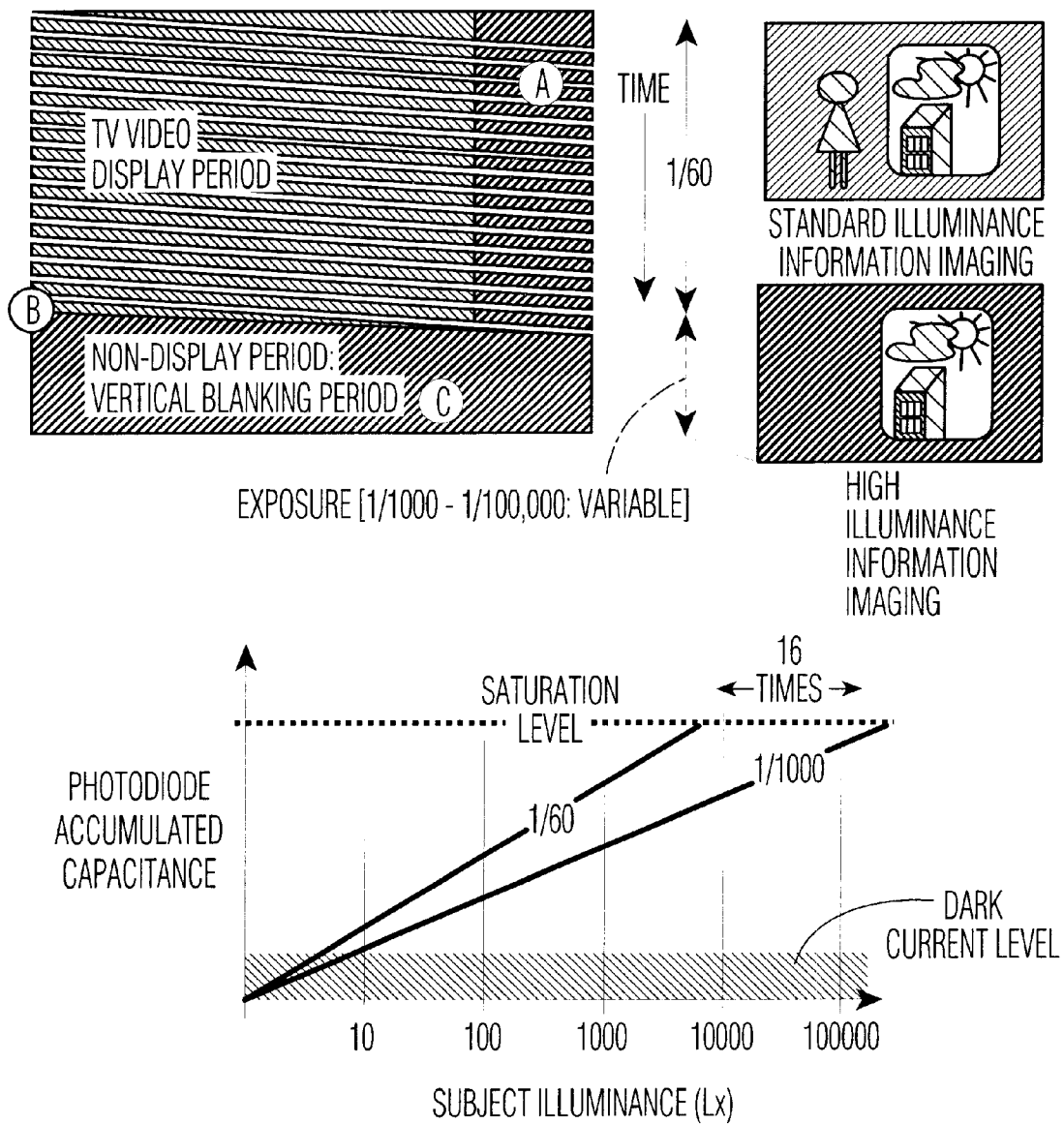
FIG. 3 is a diagram showing the performance of the improved type CCD.
Figure 4:
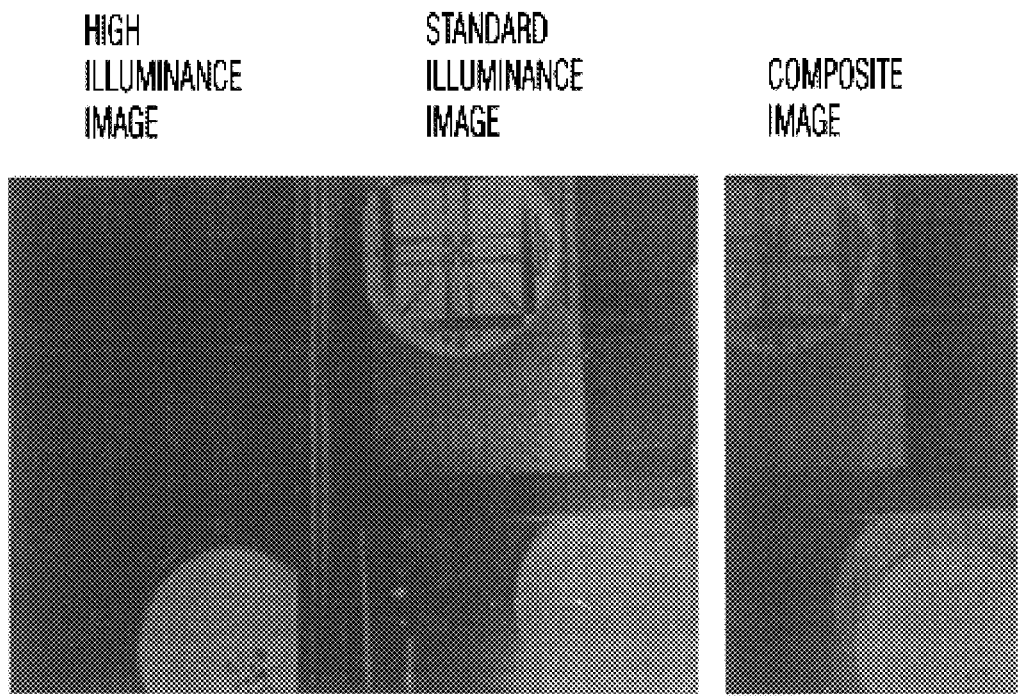
FIG. 4 is a diagram showing images captured using the improved type CCD.

Referring now to FIG. 5, there is shown therein a diagram showing the configuration of a video information adjusting apparatus according to a first embodiment of the present invention. The video information adjusting apparatus shown here is the type that can adjust illuminance information between terminals. More specifically, an input part 502 of a terminal 501 is a camera having an illuminance information acquiring part 511 and an illuminance information adjusting part 512. The illuminance information acquiring part 511 comprises a CCD of improved type and is responsible for image information collection. The illuminance information adjusting part 512 is a circuit which performs brightness adjustments on two kinds of information, high illuminance information and standard illuminance information, acquired by the improved type CCD, and which supplies image information, corresponding to part of the brightness-adjusted, expanded image information, and information concerning imaging conditions to an identifier appending part 503. An output part 503 allows the connection of a viewing apparatus (such as a display), an audio output apparatus (such as a speaker, amplifier, etc.), a recording apparatus (such as a VTR, hard disk, optical disk, etc.), and a printer or the like. A transmitting part 504 is a transmission device compatible with a LAN, CATV, modem, digital PBX, or the like. A terminal control part 505 is a control unit responsible for the overall control of these parts.

The input part 502 also allows the connection of an input device such as a keyboard, mouse, digitizer, touch panel, light pen, microphone, etc. For a general view of the terminal 501, refer to FIG. 29(a).

The operation of the present embodiment will now be described.

For explanation purposes, it is assumed here that for transmission and reception of an image the terminal 501 in the upper part of FIG. 5 acts as the transmitting terminal and the terminal 501 in the lower part as the receiving terminal.

(1) Operation of the Transmitting Terminal 501

Figure 6:
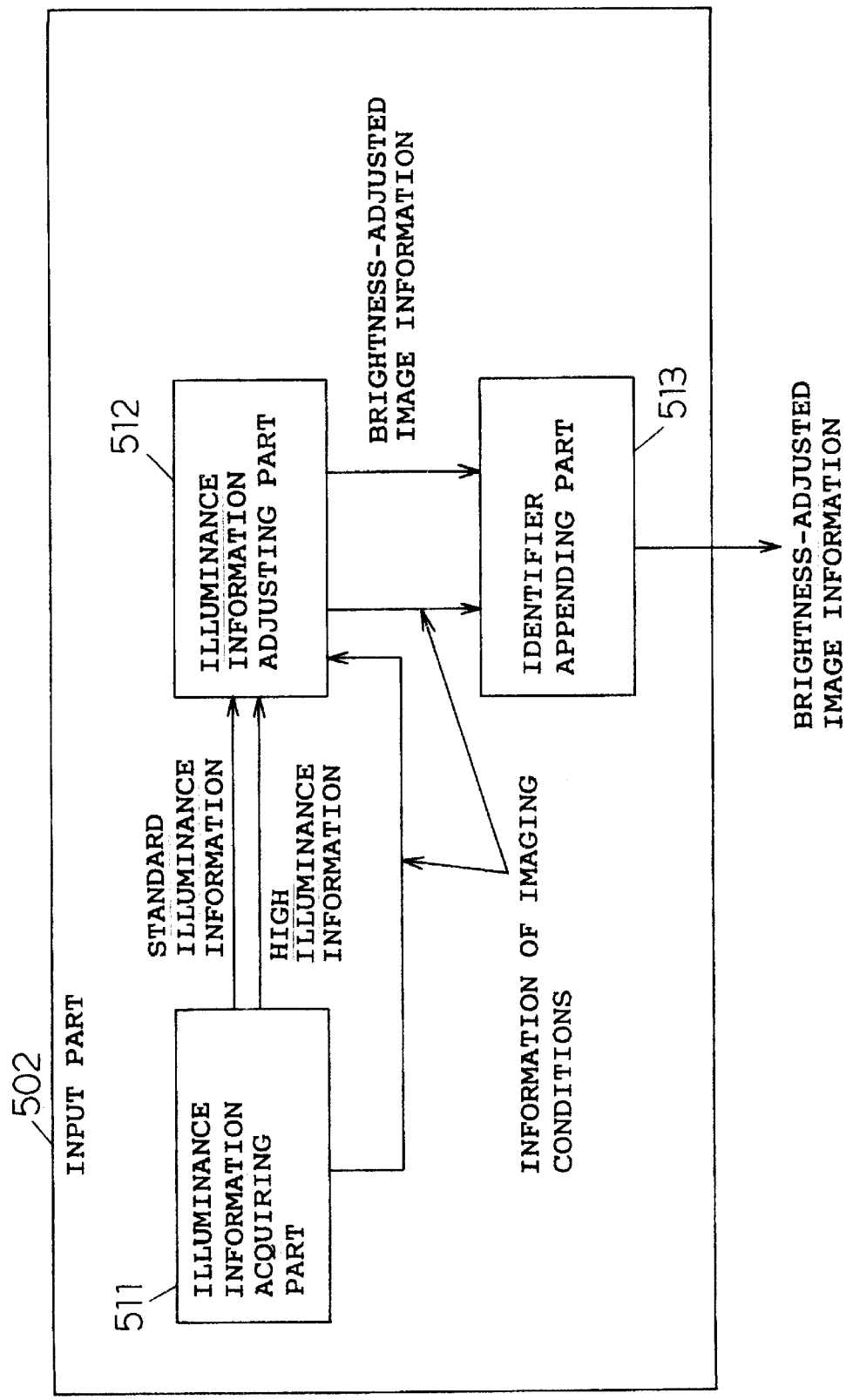
FIG. 6 is a diagram showing how two kinds of image information obtained from an illuminance information acquiring part 511 are adjusted and consolidated into one kind of image information and transmitted with imaging conditions appended thereto.

FIG. 6 is a diagram showing how the two kinds of information acquired by the illuminance information acquiring part 511 are adjusted and consolidated into one kind of image information for output. The illuminance information acquiring part 511 acquires the two kinds of image information, i.e., the high illuminance information and the standard illuminance information, and supplies them separately and independently of each other to the illuminance information adjusting part 512. The illuminance information acquiring part 511 also supplies the illuminance information adjusting part 512 with information concerning imaging conditions, including information concerning charge accumulation times, etc. obtained as imaging conditions.

The illuminance information adjusting part 512 performs brightness adjustments on the high illuminance information and standard illuminance information supplied from the illuminance information acquiring part 511, and supplies image information, corresponding to part of the resulting brightness-adjusted, expanded image information, and the information concerning imaging conditions to the identifier appending part 513.

Figure 9:
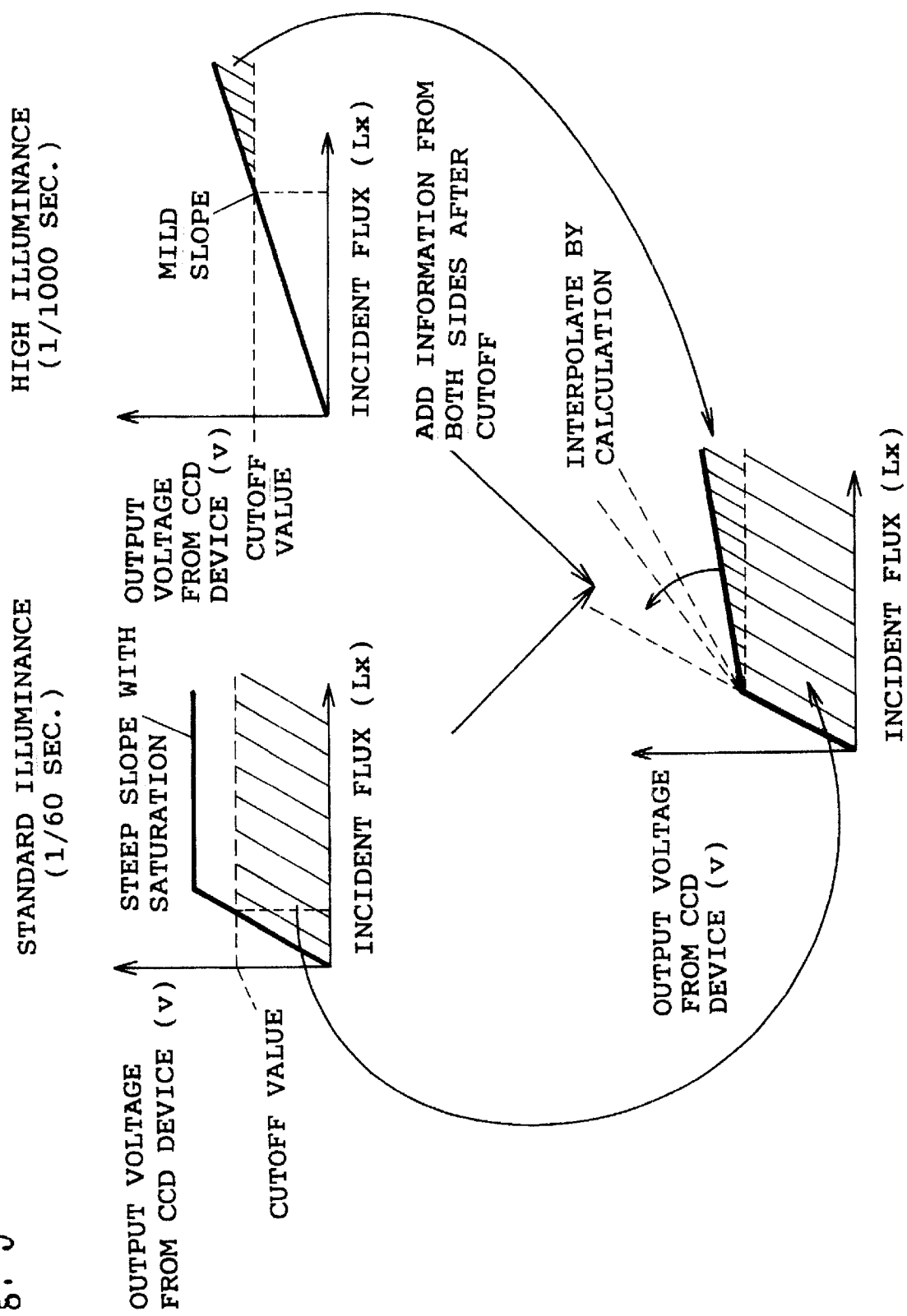
FIG. 9 is a diagram showing a process for adjusting illuminance information.

The brightness adjustment of the illuminance information will be described below with reference to FIG. 9 showing an example of the adjustment process. First, an addition is performed to add the high illuminance information to the standard illuminance information. Next, the slope of the expanded illuminance information obtained as a result of the addition is linearly interpolated by calculation (gamma correction). The result is the brightness-adjusted, expanded image information.

The illuminance information adjusting part 512 supplies the identifier appending part 513 with part of the brightness-adjusted, expanded image information (brightness-adjusted image information) corresponding to a prescribed predetermined range. The information is not supplied in its entirety because the improved type CCD has a wider dynamic range than existing monitors which therefore cannot display the entire image information of high dynamic range output from the improved type CCD. This also serves to prevent the amount of transfer from increasing. It is assumed here that the prescribed predetermined range is stored, for example, in a RAM contained in the terminal 501.

The identifier appending part 513 appends the information concerning imaging conditions to the image information for transmission. Under the control of the terminal control part 505, the transmitting part 504 outputs the information concerning imaging conditions and the brightness-adjusted image information, supplied from the identifier appending part 513, onto a transmission channel for transmission to the receiving terminal 501.

(2) Operation of the Receiving Terminal 501

The brightness-adjusted image information and information concerning imaging conditions transmitted from the transmitting terminal 501 are received by the transmitting part 504 in the receiving terminal 501. The terminal control part 505 transfers the brightness-adjusted image information received by the transmitting part 504 to the video monitor connected to the output part 503. The video monitor displays an image in accordance with the brightness-adjusted image information.

If an operator at the receiving end desires to change the brightness range of the image displayed on the monitor, the operator changes the slope of the expanded illuminance information, based on the condition of the displayed image, to improve the visibility of the image.

Changing the brightness range of the image displayed on the monitor is accomplished by the operator selecting one or the other of the up/down (or left/right) arrow keys provided, for example, on a keyboard. The code corresponding to the arrow key selected by the operator is input to the input part 502.

Under the control of the terminal control part 505, the transmitting part 504 outputs the code input via the input part 502 onto the transmission channel for transmission to the transmitting terminal 501.

Instead of the code corresponding to the selected arrow key, information concerning a desired brightness range may be transmitted.

(3) Operation of the Transmitting Terminal 501

The transmitting part 504 at the transmitting end receives the code, corresponding to the arrow key, transmitted from the receiving terminal 501. Based on the code corresponding to the arrow key, the terminal control part 505 changes the prescribed range stored in the RAM.

The illuminance information adjusting part 512 transfers to the identifier appending part 513 the information concerning imaging conditions and part of the brightness-adjusted, expanded image information (brightness-adjusted image information) corresponding to the thus changed prescribed range stored in the RAM.

The identifier appending part 513 appends the information concerning imaging conditions to the brightness-adjusted image information for transmission. Under the control of the terminal control part 505, the transmitting part 504 outputs the information concerning imaging conditions and the brightness-adjusted image information, supplied from the identifier appending part 513, onto the transmission channel for transmission to the receiving terminal 501.

(4) Operation of the Receiving Terminal 501

The brightness-adjusted image information and information concerning imaging conditions transmitted from the transmitting terminal 501 are received by the transmitting part 504 in the receiving terminal 501. The terminal control part 505 transfers the brightness-adjusted image information received by the transmitting part 504 to the video monitor connected to the output part 503. The monitor displays an image in accordance with the brightness-adjusted image information. In this way, the brightness of the image information transmitted from the transmitting terminal 501 can be set to the brightness range desired by the operator at the receiving end.

However, if the brightness of the image information is changed, there may arise cases in which the imaging conditions of the illuminance information acquiring part 511 in the transmitting terminal 501 are not appropriate. In that case, the imaging conditions must be changed.

In the present embodiment, the information concerning the imaging conditions is transmitted to the receiving terminal 501, together with the brightness-adjusted image information. Therefore, based on the information concerning the imaging conditions, the imaging conditions of the illuminance information acquiring part 511 in the transmitting terminal 501 can be changed from the receiving terminal 501 within the operable range of that illuminance information acquiring part 511.

The operator of the receiving terminal 501 changes the imaging conditions of the illuminance information acquiring part 511 in the transmitting terminal 501 by using, for example, a keyboard. The imaging conditions thus changed are input to the input part 502. Under the control of the terminal control part 505, the transmitting part 504 outputs the changed imaging conditions onto the transmission channel for transmission to the transmitting terminal 501.

(5) Operation of the Transmitting Terminal 501

The transmitting part 504 at the transmitting end receives the changed imaging conditions from the receiving terminal 501. Based on the changed imaging conditions received by the transmitting part 504, the terminal control part 505 changes the imaging conditions of the illumination information acquiring part 511. Changing the imaging conditions can be accomplished by controlling the accumulation time in the CCD in accordance with a predetermined rule (for example, to achieve an illuminance level 16 times higher than the previous level the shutter speed of the camera for high-light-level imaging is set to $1/1000$ [sec], or the shutter speed of the camera is changed according to the working condition of the user).

The illuminance information acquiring part 511, whose imaging conditions have been changed, acquires the two kinds of image information, high illuminance information and standard illuminance information, on the basis of the changed imaging conditions, and supplies the two kinds of image information separately and independently of each other to the illumination information adjusting part 512. The illuminance information acquiring section 511 also supplies the changed imaging conditions to the illumination information adjusting part 512.

As is apparent from the above description, according to the present embodiment, the brightness-adjusted image information transmitted from the transmitting terminal 501 is adjusted to the brightness range selected by the operator at the receiving end. Also, the configuration allowing independent control of each kind of illuminance information provides greater freedom in user operation though it involves an increase in cost. Further, since brightness adjustment is performed in the terminal at the imaging end and the resulting information is transmitted as one kind of information, the transmission capacity can be reduced.

Further, according to the configuration of the present embodiment, the information concerning imaging conditions is transmitted to the receiving terminal 501, but in an alternative configuration, the information concerning imaging conditions may not be transmitted to the receiving terminal 501. In that case, the dynamic range of the improved type CCD in the illuminance information acquiring part 511 is treated as a fixed range, and the receiving terminal 501 adjusts the dynamic range within that fixed range.

The network topology for connecting the terminals is not limited to a bus topology, but a ring network, such as an FDDI or ATM-LAN, or even a star network may be employed.

Further, i n an alternative method of acquiring high illuminance information and standard illuminance information by the illuminance information acquiring part 511, the two kinds of illuminance information may be obtained from the same object by using a camera or CCD having two different shutter speeds, and threshold values may be set for the two kinds of illuminance information.

Embodiment 2

Figure 7:
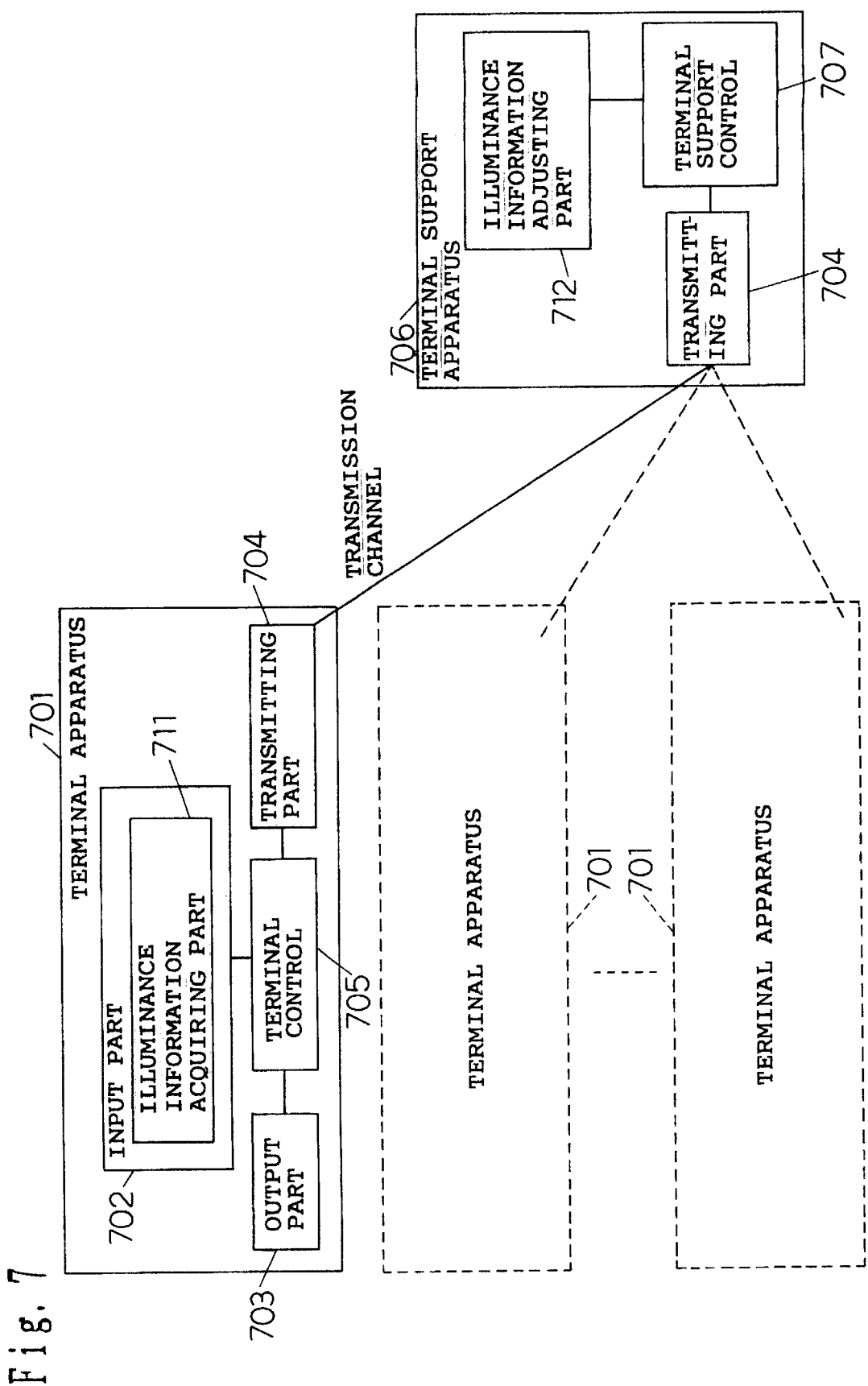
FIG. 7 is a diagram showing the configuration of a video information adjusting apparatus according to a second embodiment of the present invention.

Referring to FIG. 7, there is shown therein a diagram showing the configuration of a video information adjusting apparatus according to a second embodiment of the present invention. The apparatus shown here is the type that controls the illuminance information centrally in one location. First, the configuration of a terminal 701 will be described. An input part 702 of the terminal 701 is a camera having an illuminance information acquiring part 711. The illuminance information acquiring part 711 comprises a CCD of improved type and is responsible for image information collection. An output part 703 allows the connection of a viewing apparatus (such as a display), an audio output apparatus (such as a speaker, amplifier, etc.), a recording apparatus (such as a VTR, hard disk, optical disk, etc.), and a printer or the like. A transmitting part 704 is a transmission device compatible with a LAN, CATV, modem, digital PBX, or the like. A terminal control part 705 is a control unit responsible for the overall control of these parts.

The input part 702 also allows the connection of an input device such as a keyboard, mouse, digitizer, touch panel, light pen, microphone, etc.

Next, the configuration of a terminal support apparatus 706 for controlling and managing a plurality of terminals 701 will be described. A transmitting part 704 is an information transmitting device compatible with a LAN, CATV, modem, digital PBX, etc. An illuminance information adjusting part 712 is a circuit which transmits out two kinds of information, high illuminance information and standard illuminance information, acquired by the improved type CCD, together with information concerning imaging conditions. A terminal support control part 707 is a control unit responsible for the overall control of these parts and for the control and management of the plurality of terminals 701.

Next, the operation of the present embodiment will be described.

Figure 8:
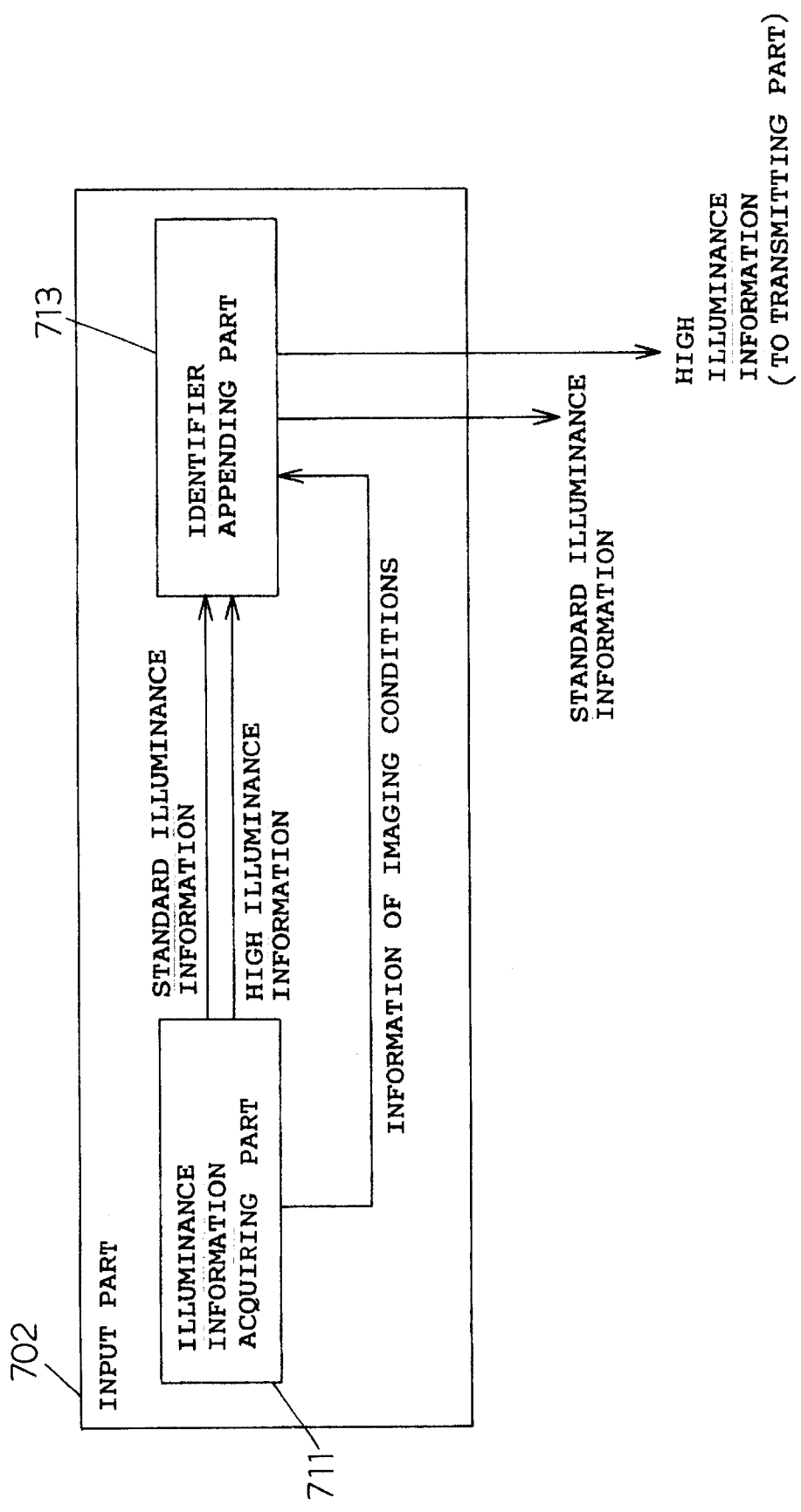
FIG. 8 is a diagram showing how two kinds of image information obtained from an illuminance information acquiring part 711 are transmitted independently of each other.

FIG. 8 is a diagram showing how the two kinds of image information acquired by the illuminance information acquiring part 711 are transmitted independently of each other. The illuminance information acquiring part 711 acquires the two kinds of image information, i.e., the high illuminance information (for example, an image captured by the improved type CCD with charge accumulation time set to $\frac{1}{1,000}$ [sec])) and the standard illuminance information (for example, an image captured with charge accumulation time set to $\frac{1}{60}$ [sec]), and transfers them separately and independently of each other to an identifier appending part 713. The illuminance information acquiring part 711 also supplies the identifier appending part 713 with information concerning imaging conditions, including information concerning charge accumulation times, etc. obtained as imaging conditions.

The identifier appending part 713 appends the information concerning imaging conditions to each of the high illuminance information and standard illuminance information, and outputs each kind of information with the appended information, separately and independently. Under the control of the terminal control part 705, the transmitting part 704 outputs each of the high illuminance information and standard illuminance information, supplied from the identifier appending part 713, onto the transmission channel for transmission to the terminal support apparatus 706.

The high illuminance information and standard illuminance information, each transmitted together with the information concerning shooting conditions from the terminal equipment 701, are received by the transmitting part 704 in the terminal support apparatus 706. The terminal support control part 707 transfers the high illuminance information and standard illuminance information, received by the transmitting part 704, to the illuminance information adjusting part 712. The illuminance information adjusting part 712 creates brightness-adjusted image information in the same manner as in the illuminance information adjusting part 512 in the first embodiment.

Here, if it is assumed that the terminal support apparatus 706 is an apparatus used at a security control center, then each terminal 701 corresponds to a monitoring camera installed at a site to be monitored. In this case, the illuminance information adjusting part 712 is assigned to all or part of the terminals 701. Then, the brightness-adjusted image information created by the illuminance information adjusting part 712 assigned to each terminal is displayed on one of a plurality of video monitors.

At this time, the high illuminance information and the standard illuminance information are separately recorded on a recording apparatus (not shown). If the recorded image is analyzed later, it will be found that it contains more information than image information that an ordinary camera can handle. This improves the analyzing capability of the security system. The analyzing capability of the security system can also be enhanced by recording images at high resolution, as will be described later.

The terminal 701 transmits the information concerning imaging conditions to the terminal support apparatus 706 for a reason similar to that given in the description of the first embodiment, that is, to enable the imaging conditions of the illuminance information acquiring part 711 to be changed from the terminal support apparatus 706.

As is apparent from the above description, according to the present embodiment, the amount of information transmitted is twice as large as the amount of information that could be obtained from an ordinary camera, but as compared to the previous system, information of a wider dynamic range can be handled. Therefore, by adjusting the image information of wide dynamic range, the operator at the receiving end can obtain an image in desired condition.

In the configuration of the present embodiment, the terminal 701 is provided with the illuminance information acquiring part 711, but not with the illuminance information adjusting part; however, it may also be provided with the same illuminance information adjusting part as the illuminance information adjusting part 712 in the terminal support apparatus 706.

Further, it has been described that the identifier appending part 713 appends the absolute value of charge accumulation time to each of the two kinds of illuminance information for transmission, but instead, the ratio of charge accumulation time may be appended for transmission.

Furthermore, the terminal support apparatus 706 may be so configured to create brightness-adjusted image information from the high illuminance information and standard illuminance information received from one terminal 701 and to transfer the thus created information to another terminal 701. In this way, in a teleconference using telecommunication lines, for example, the picture quality of each individual video monitor can be controlled centrally.

It is also possible to combine the system of the first embodiment with the system of the second embodiment. For example, if the receiving terminal has a high computational power, computation of the illuminance information can be performed at the receiving end; therefore, the standard illuminance information and high illuminance information may be transmitted separately, as in the second embodiment. Conversely, if the computational power of the receiving terminal is low, computation of the illuminance information is performed at the transmitting terminal (or at a terminal having a capability to compute the illuminance information), and then the brightness-adjusted image information is transmitted to the destination, as in the first embodiment.

Embodiment 3

Figure 10:
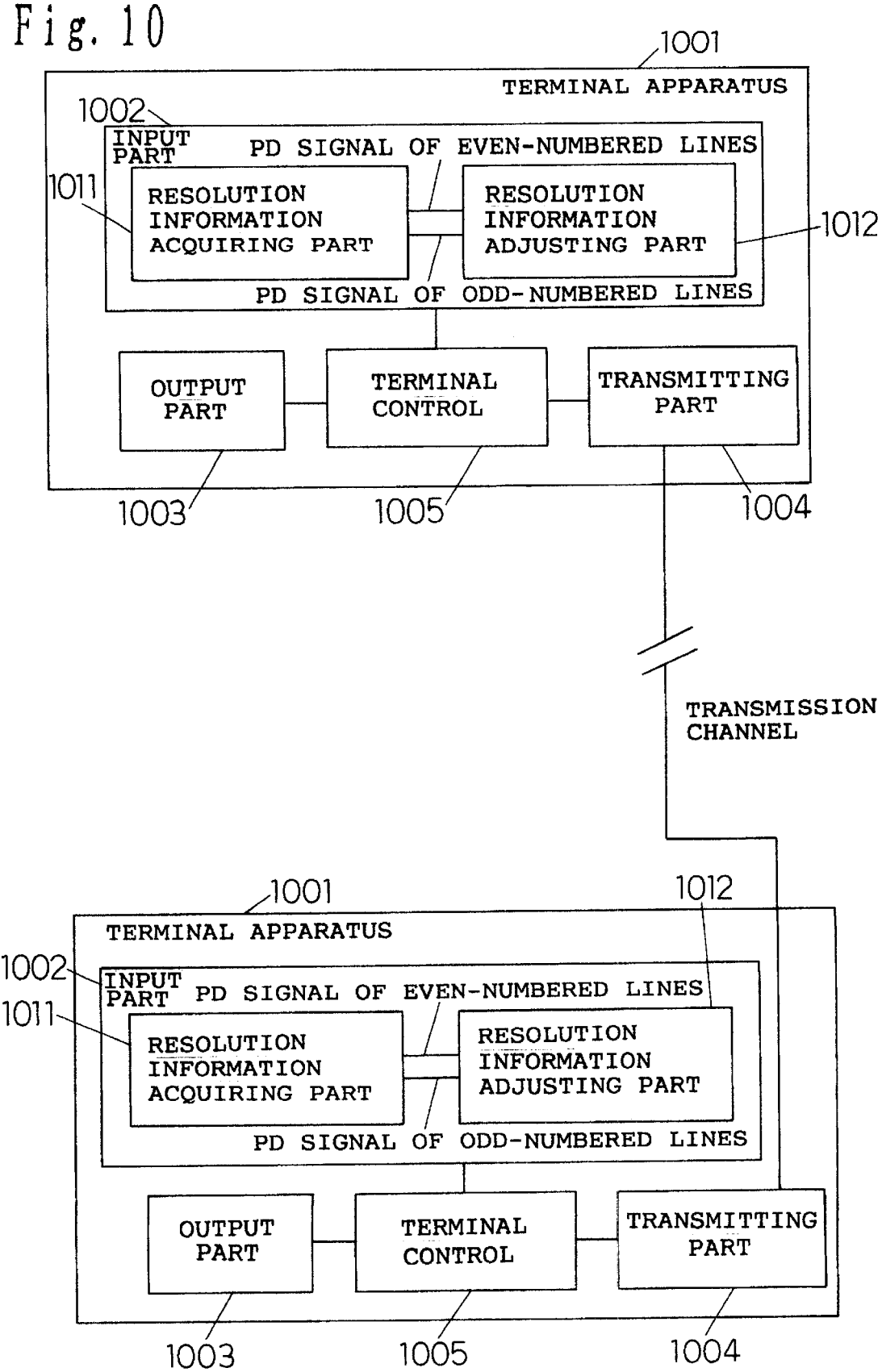
FIG. 10 is a diagram showing the configuration of a video information adjusting apparatus according to a third embodiment of the present invention.

Referring to FIG. 10, there is shown therein a diagram showing the configuration of a video information adjusting apparatus according to a third embodiment of the present invention. The video information adjusting apparatus shown here is the type that can adjust resolution between terminals. More specifically, an input part 1002 of a terminal 1001 is a camera having a resolution information acquiring part 1011 and a resolution information adjusting part 1012. The resolution information acquiring part 1011 comprises a CCD of improved type and outputs a PD signal of even-numbered lines and a PD signal of odd-numbered lines separately and independently of each other on a field-by-field basis. The resolution information adjusting part 1012 is a device for generating image information at prescribed resolution by using the PD signals of even-numbered lines and odd-numbered lines supplied from the resolution information acquiring part 1011. An output part 1003 allows the connection of a display apparatus (such as a display), an audio output apparatus (such as a speaker, amplifier, etc.), a recording apparatus (such as a VTR, hard disk, optical disk, etc.), and a printer or the like. A transmitting part 1004 is a transmission device compatible with a LAN, CATV, modem, digital PBX, or the like. A terminal control part 1005 is a control unit responsible for the overall control of these parts. The input part 1002 also allows the connection of an input device such as a keyboard, mouse, digitizer, touch panel, light pen, microphone, etc.

The operation of the present embodiment will now be described.

For explanation purposes, it is assumed here that for transmission and reception of image information the terminal 1001 in the upper part of FIG. 10 acts as the transmitting terminal and the terminal 1001 in the lower part as the receiving terminal.

(1) Operation of the Transmitting Terminal 1001

The resolution information acquiring part 1011 outputs a PD signal of even-numbered lines and a PD signal of odd-numbered lines separately and independently of each other on a field-by-field basis.

Here, a description will be given of how the resolution information adjusting part 1012 generates image information at prescribed resolution.

1. Generation of Standard Resolution Image Information

The resolution information adjusting part 1012 mixes the PD signals of even-numbered lines and odd-numbered lines, for example, as in the NTSC system, and generates image information at NTSC resolution. This is fundamentally the same as the operation of an ordinary CCD, and an image having fundamentally the same resolution as with a conventional CCD is obtained. The resolution thus obtained is set as the standard resolution. This readout control provides the initial setting of the apparatus of the present embodiment.

2. Acquisition of High Resolution Image Information

The resolution information adjusting part 1012 generates image information with about 30% enhanced resolution by processing the PD signals of even-numbered lines and odd-numbered lines separately without mixing them together. The resolution thus obtained is referred to as the high resolution.

3. Acquisition of Low Resolution Image Information

The resolution information adjusting part 1012 generates image information by using either the PD signal of even-numbered lines or PD signal of odd-numbered lines. The image thus generated by the resolution information adjusting part 1012 has a resolution reduced by a factor of 4 compared to the standard resolution. The resolution thus obtained is referred to as the low resolution.

Under the control of the terminal control part 1005, the transmitting part 1004 outputs the information concerning imaging conditions and the image information generated by the resolution information adjusting part 1012, onto the transmission channel for transmission to the receiving terminal 1001. Since this is the initial operation, the image information transmitted from the transmitting part 1004 is standard resolution image information.

(2) Operation of the Receiving Terminal 1001

The standard resolution image information and the information concerning imaging conditions, transmitted from the transmitting terminal 1001, are received by the transmitting part 1004 in the receiving terminal 1001. The terminal control part 1005 transfers the image information received by the transmitting part 1004 to the video monitor connected to the,output part 1003. The video monitor displays an image on its screen in accordance with the standard resolution image information.

Here, there may arise cases in which the operator at the receiving end desires to change the standard resolution image displayed on the monitor to a high resolution image, for example.

Changing the resolution of the image displayed on the video monitor is accomplished by the operator selecting one or the other of the up/down (or left/right) arrow keys provided, for example, on a keyboard. The code corresponding to the arrow key selected by the operator is input to the input part 1002.

Under the control of the terminal control part 1005, the transmitting part 1004 outputs the code input via the input part 1002 onto the transmission channel for transmission to the transmitting terminal 1001.

Instead of the code corresponding to the selected arrow key, information concerning desired resolution may be transmitted.

(3) Operation of the Transmitting Terminal 1001

The transmitting part 1004 at the transmitting end receives the code, corresponding to the arrow key, transmitted from the receiving terminal 1001. Based on the code corresponding to the arrow key, the terminal control part 1005 changes the mode of processing in the resolution information adjusting part 1012. In this case, the mode of processing is changed from standard resolution t o high resolution.

The resolution information adjusting part 1012 generates image information at high resolution by using the PD signals of even-numbered lines and odd-numbered lines supplied from the resolution information acquiring part 1011, and outputs the thus generated image information together with the information concerning imaging conditions. Under the control of the terminal control part 1005, the transmitting part 1004 outputs the information concerning imaging conditions and the image information generated by the resolution information adjusting part 1012 onto the transmission channel for transmission to the receiving terminal 1001.

(4) Operation of the Receiving Terminal 1001

The image information and the information concerning imaging conditions, transmitted from the transmitting terminal 1001, are received by the transmitting part 1004 in the receiving terminal 1001. The terminal control part 1005 transfers the image information received by the transmitting part 1004 to the video monitor connected to the output part 1003. The video monitor displays an image in accordance with the high resolution image information. In this way, the resolution of the image information transmitted from the transmitting terminal 1001 can be set to the resolution desired by the operator at the receiving end.

In other respects, the operation is the same as that described in the first embodiment.

As is apparent from the above description, in the present embodiment, image resolution can be controlled independently. This configuration provides greater freedom in user operation though it involves an increase in cost.

The network topology for connecting the terminals is not limited to a bus topology, but a ring network, such as an FDDI or ATM-LAN, or even a star network may be employed.

Embodiment 4

Figure 11:
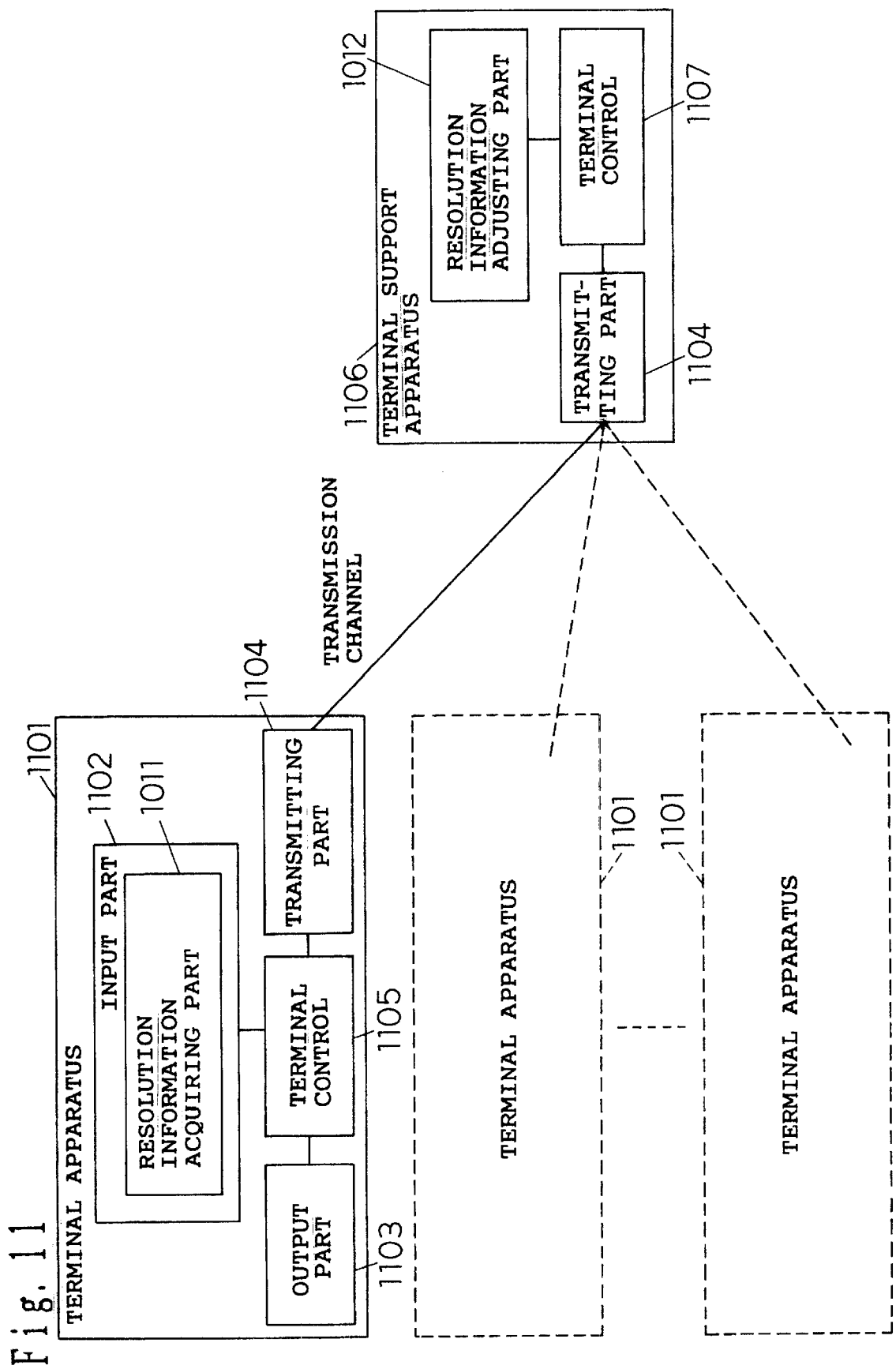
FIG. 11 is a diagram showing the configuration of a video information adjusting apparatus according to a fourth embodiment of the present invention.

Referring to FIG. 11, there is shown therein a diagram showing the configuration of a video information adjusting apparatus according to a fourth embodiment of the present invention. The video information adjusting apparatus shown here is the type that controls resolution information centrally in one location. First, the configuration of a terminal 1101 will be described. An input part 1102 is a camera having a resolution information acquiring part 1011. The resolution information acquiring part 1011 comprises a CCD of improved type and outputs a PD signal of even-numbered lines and a PD signal of odd-numbered lines separately and independently of each other. An output part 1103 allows the connection of a viewing apparatus (such as a display), an audio output apparatus (such as a speaker, amplifier, etc.), a recording apparatus (such as a VTR, hard disk, optical disk, etc.), and a printer or the like. A transmitting part 1104 is a transmission device compatible with a LAN, CATV, modem, digital PBX, or the like. A terminal control part 1105 is a control unit responsible for the overall control of these parts.

The input part 1102 also allows the connection of an input device such as a keyboard, mouse, digitizer, touch panel, light pen, microphone, etc.

Next, the configuration of a terminal support apparatus 1106 for controlling and managing a plurality of terminals 1101 will be described. A transmitting part 1104 is an information transmitting device compatible with a LAN, CATV, modem, digital PBX, etc. A resolution information adjusting part 1110 is a circuit for generating image information at standard resolution, high resolution, or low resolution by using the PD signals of even-numbered lines and odd-numbered lines transmitted from the terminal control part 1105. A terminal control part 1107 is a control unit responsible for the overall control of these parts and for the control and management of the plurality of terminals 1107.

The system configuration of the present embodiment is similar to that of the second embodiment. The difference is that in the present embodiment the resolution information is adjusted, not the illuminance information. The operation for changing the resolution has been described in detail in the third embodiment, and therefore, the description will not be repeated here.

Embodiment 5

Figure 12:
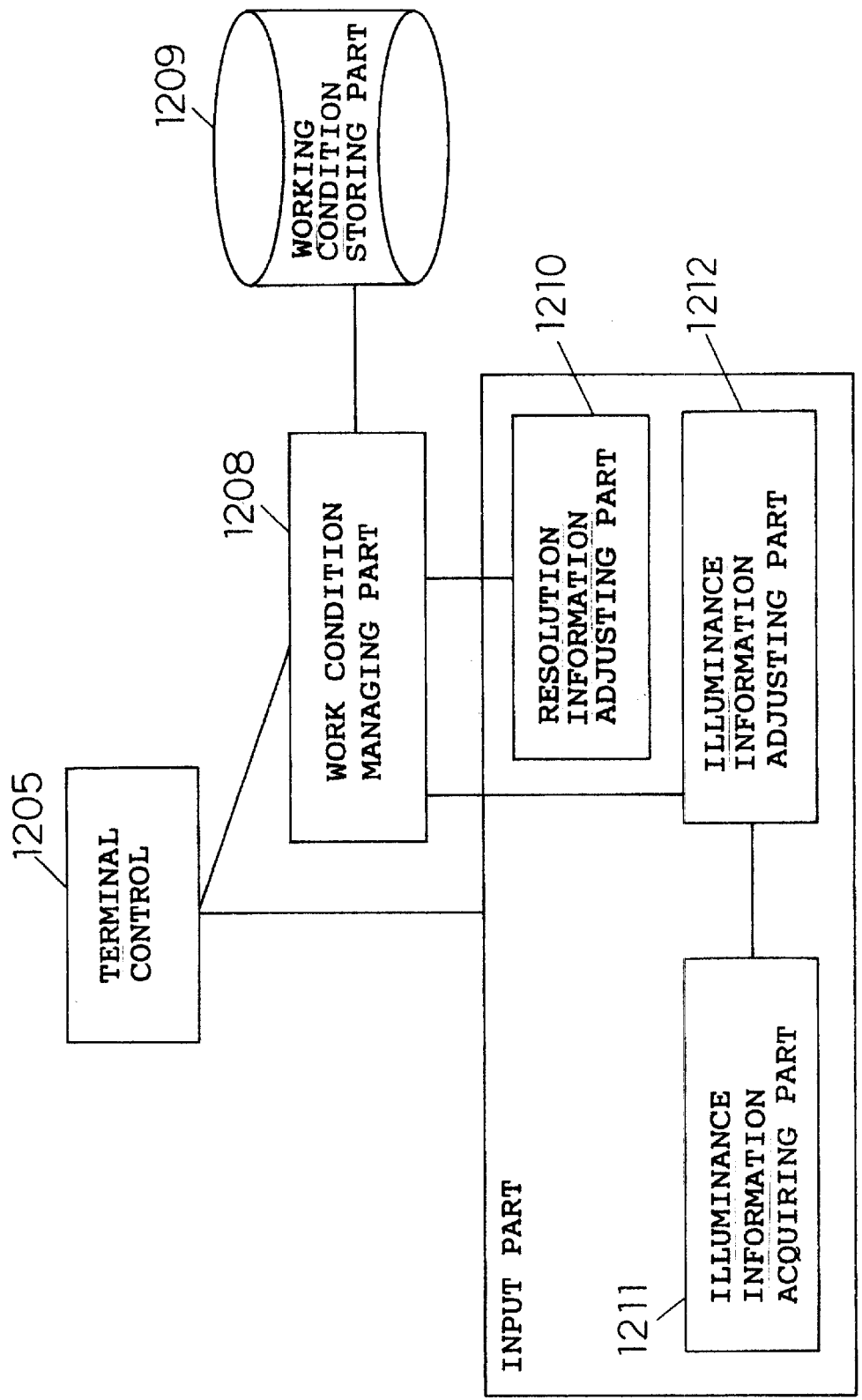
FIG. 12 is a diagram showing the configuration of a video information adjusting apparatus according to a fifth embodiment of the present invention.
Figure 13:
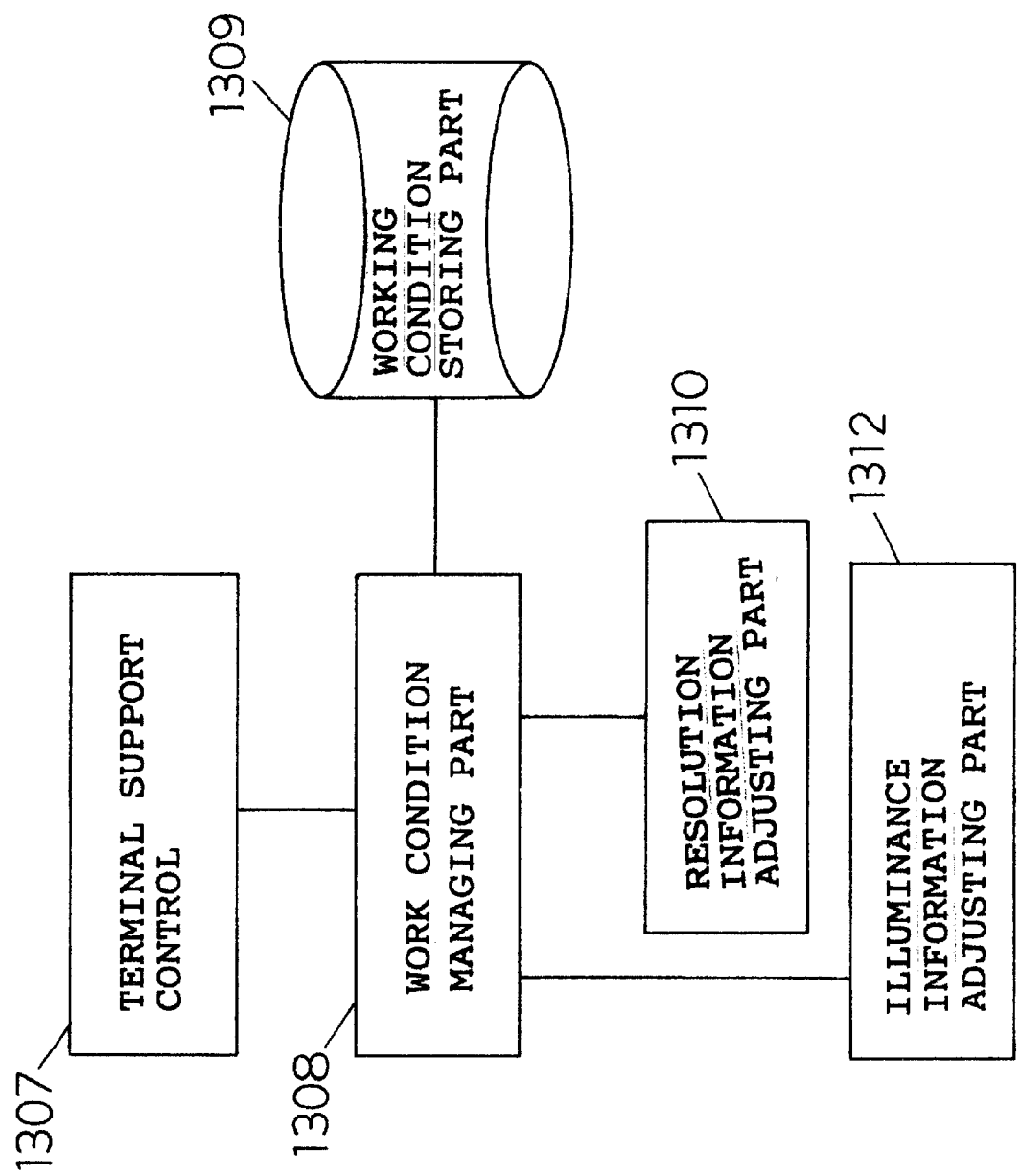
FIG. 13 is a diagram showing the configuration of a video information adjusting apparatus according to the fifth embodiment of the present invention.

FIGS. 12 and 13 are diagrams showing the configuration of an video information adjusting apparatus according to a fifth embodiment of the present invention. The video information adjusting apparatus shown here monitors the working condition of a terminal user, and based on the working condition, automatically adjusts the previously described illuminance information adjusting part and resolution information adjusting part. The video information adjusting apparatus is shown in two types: one is the terminal apparatus shown in FIG. 12 and the other is the terminal support apparatus shown in FIG. 13. A working condition managing part 1208 (or 1308) for managing the working condition of the user is controlled by a terminal control part 1205 (or terminal support control part 1307). The working condition of the user is stored in a working condition storing part 1209 (or 1309) for management.

Figure 14:
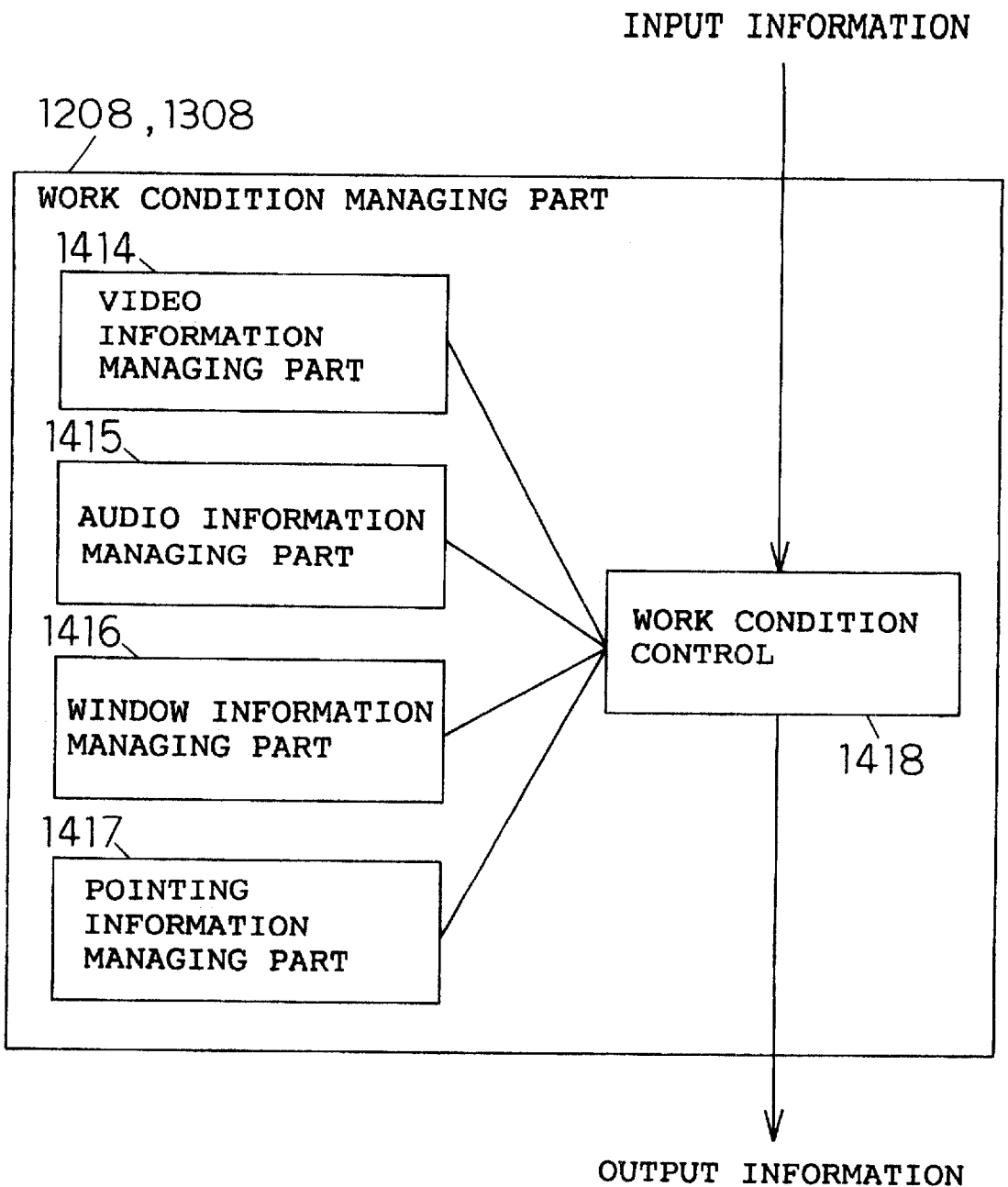
FIG. 14 is a diagram showing the configuration of a working condition managing part.

FIG. 14 is a diagram showing the configuration of the working condition managing part 1208 (or 1308). The working condition managing part 1208 (or 1308) comprises: a video information managing part 1414 for man aging a change in the condition of video information (for example, a video scene change); an audio information managing part 1415 for managing a change in the condition of audio information (for example, a change in audio power or discrimination between noise and conversation); a window information managing part 1416 for managing a change in the condition of a window (for example, a window size change) being used to process information by an individual or between individuals; a pointing information managing part 1417 for managing a change in user action to point to a document (the pointing device used for pointing includes a mouse pointer, a touch panel, etc.); and a working condition control part 1418 for controlling and managing these parts. The working condition managing part 1208 (or 1308) may include all or part of the video information managing part 1414, audio information managing part 1415, window information managing part 1416, and pointing information managing part 1417.

(1) Video Information Managing Part 1414

Figure 15:
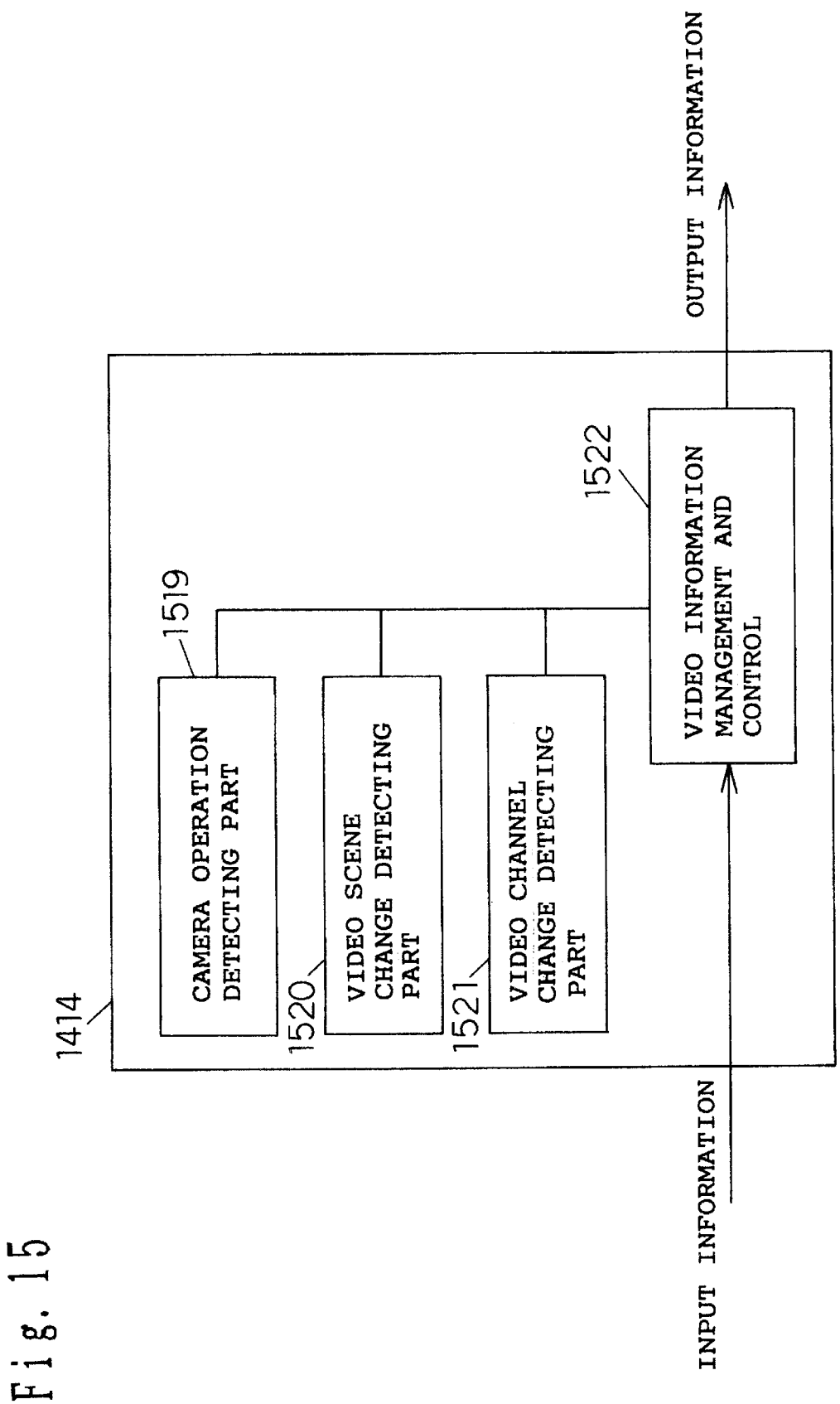
FIG. 15 is a diagram showing the configuration of a video information managing part 1414.

FIG. 15 is a diagram showing the configuration of the video information managing part 1414. The video information managing part 1414 comprises: a camera operation detecting part 1519 for detecting a camera operation; a video scene change detecting part 1520 for detecting a video scene change; a video channel change detecting part 1521 for detecting a change in video channel selection by the user when there are a plurality of video channels; and a video information management and control part 1522 for controlling and managing these parts.

The camera operation detecting part 1519 detects a change in operating conditions unique to the camera. This is done because image information before and after an operation of the camera can be regarded as image information significant for the user. That is, the camera operation detecting part 1519 detects whether any camera operation, such as zooming, focusing, panning, or tilting, has been performed.

The video scene change detecting part 1520, based on the image information captured by the camera, detects the presence or absence of a change in the image being captured. For example, the video scene change detecting part 1520 detects the presence or absence of a change in the image being captured, based on the difference between frames. If the calculated difference is greater than a prescribed value, then it can be determined that a change has occurred in the image being captured. Accordingly, when a document is being captured by a camera for shooting materials, for example, if the user points to the document,the pointing action can be detected.

The video channel change detecting part 1521 detects the video channel to which the user's attention is directed when a number of video channels are presented to conference participants. For example, the video channel may be the video channel most recently selected or selected by the most users, among a plurality of video channels.

This makes it possible to determine the full-motion window to which the user's attention is directed, so that the resolution or brightness of the attention window can be increased while reducing the resolution or brightness of other windows. Furthermore, since image resolution or brightness can be controlled automatically, wastage of computer resources can be prevented automatically.

FIG. 20 is a chart showing an example of information managed in the video information managing part 1414. The video information managing part 1414 manages information consisting of the content of video information change, the originator of the change, the time and date of the change, and the location of the change. To implement a method of detecting a change in video information, for example, an infrared sensor for detecting the movement of a hand is attached to a camera for shooting materials for presenting a document, or a ultrasonic sensor for detecting the presence or absence of the user is attached to a person pickup camera for picking up the expression of the user; in this way, a change in the condition of video information can be detected. By using various sensors according to the purpose, information concerning the movement of the user can be obtained. The movement information can also be obtained by utilizing difference information between frames of video information obtained from the camera.

FIG. 21 also is a chart showing an example of information managed in the video information managing part 1414. In this example, the video information managing part 1414 manages information consisting of the content of camera operation change, the originator of the change, the time and date of the change, and the location of the change, other than the management information for video information described with reference to FIG. 20.

(2) Audio Information Managing part 1415

A description will be given of the working condition managing part 1208 (1308) when it is equipped with the audio information managing part 1415. The working condition managing part 1208 (1308) accepts audio information as input information and transfers it to the audio information managing part 1415. The audio information managing part 1415 detects a voice part and a voiceless part from the audio information. When a voice part is detected from the audio information, the audio information managing part 1415 out puts an instruction code to present video information at high resolution for the length of time predetermined by the user. In accordance with the instruction code, the resolution information adjusting part 1210 (or 1310) outputs video information at high resolution for the predetermined length of time.

This permits the adjustment of data rates of video information for transmission, thus limiting unnecessary use of computer resources such as the amount of communication. In particular, by raising the resolution of a full-motion window where a speaking participant is displayed, it becomes easy to grasp the expression and atmosphere of the speaking person.

Further, in the case of a teleconference in which a plurality of persons participate, if the display brightness of a full-motion window displaying a s peaking participant is increased and the brightness of other windows is reduced, the overall atmosphere of the conversation being conducted within the group can be more easily grasped.

Figure 16:
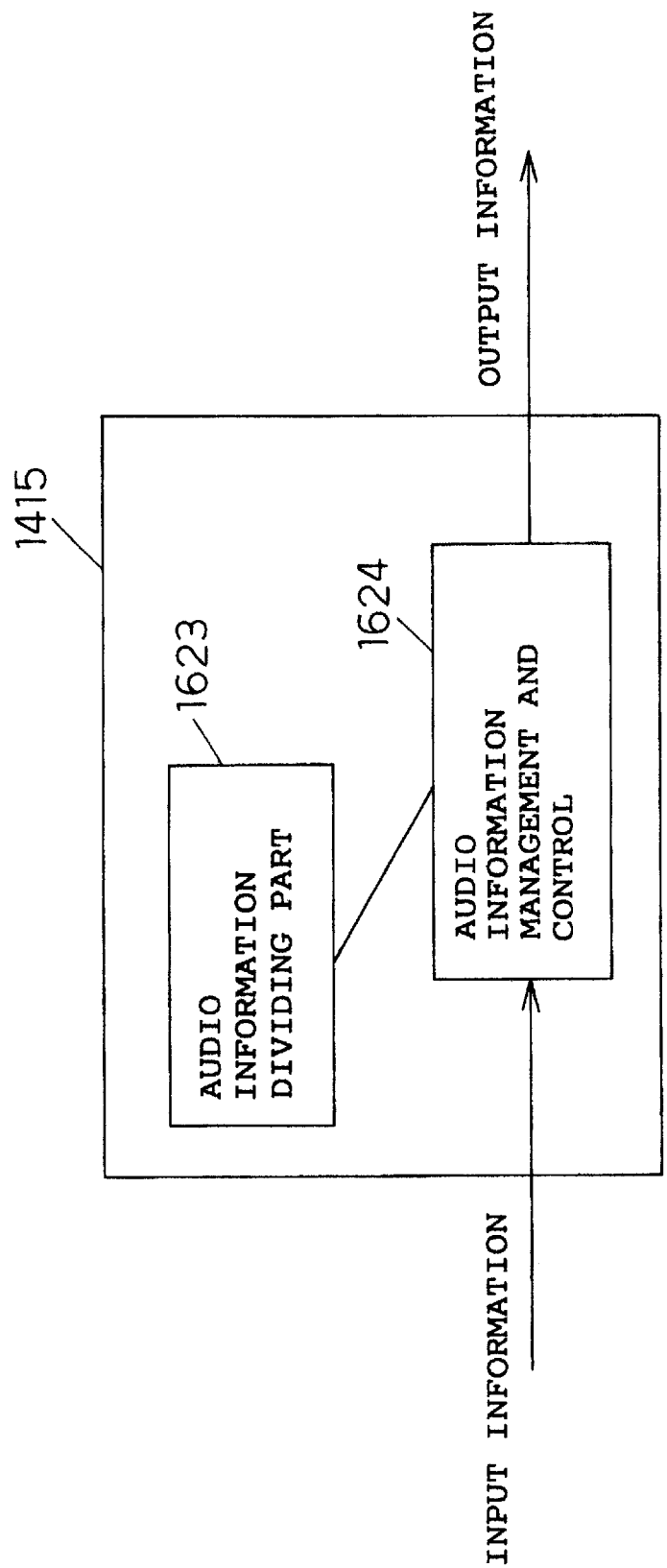
FIG. 16 is a diagram showing the configuration of an audio information managing part 1415.

FIG. 16 is a diagram showing the configuration o f the audio information managing part 1415. The audio information managing part 1415 comprises an audio information dividing part 1623 for detecting a voice part from audio information, and an audio information management and control part 1624 for managing and controlling the audio information dividing part 1623.

FIG. 19 is a chart showing an example of information managed in the audio information managing part 1415. The audio information managing part 1415 manages information consisting of the name of user originating voice, the start time of voice part, and the block length of the voice part.

(3) Window Information Managing Part 1416

A description will be given of the working condition managing part 1208 (1308) when it is equipped with the window information managing part 1416. The window information managing part 1416 examines information about the usage of the windows under its management. When the user has performed a prescribed operation on a full-motion window, the window information managing part 1416 determines that the user's attention is directed to that full-motion window, and thus raises the resolution or display brightness of the image displayed in that window. On the other hand, for full-motion windows where no user operations have been performed for a predetermined time, the resolution or brightness of such windows is reduced to prevent wastage of computer resources. This enhances the efficiency of operation. Here, the prescribed operation may be predetermined by the user.

Figure 17:
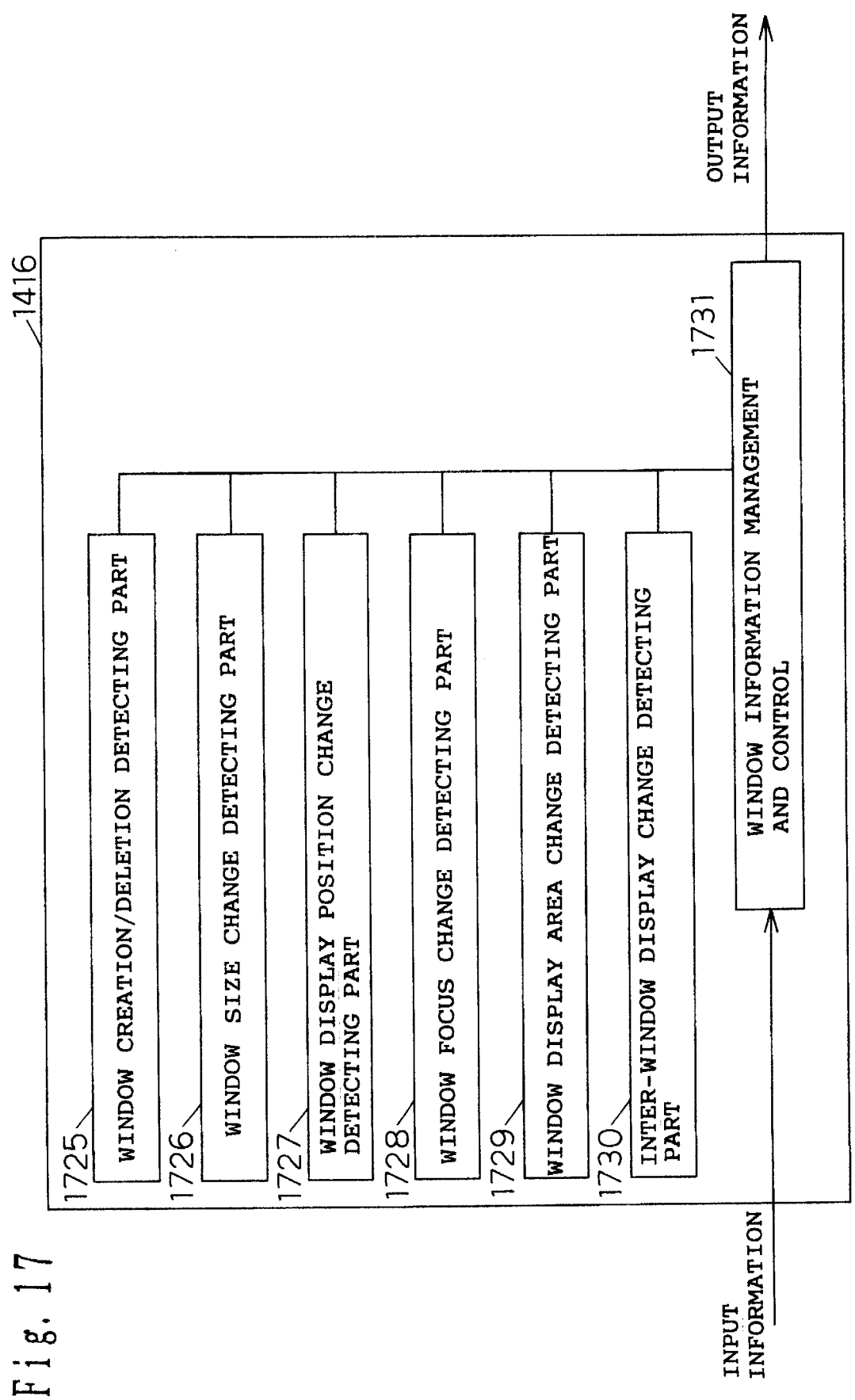
FIG. 17 is a diagram showing the configuration of a window information managing part 1416.

FIG. 17 is a diagram showing the configuration of the window information managing part 1416. The window information managing part 1416 comprises: a window creation/deletion detecting part 1725 for detecting the creation/deletion of a window; a window size change detecting part 1726 for detecting a window size change; a window display position change detecting part 1727 for detecting the displayed position of a window; a window focus change detecting part 1728 for detecting a change in window focus (switching the window to be edited (discussed) among users); a window display area change detecting part 1729 for detecting a change in the display area of information to be displayed in a window; an inter-window display change detecting part 1730 for detecting a change in overlapping relations among a plurality of windows; and a window information management and control part 1731 for controlling these detecting parts.

Figure 23:
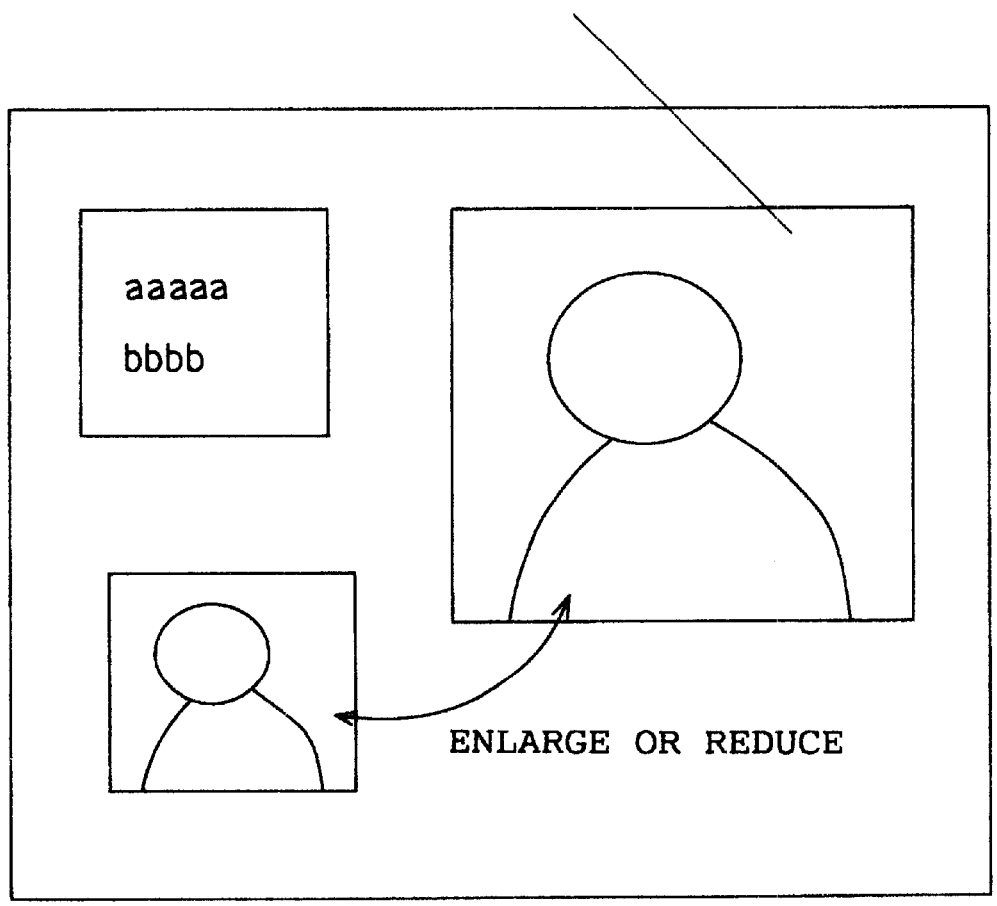
FIG. 23 is a diagram showing a method of determining a user's attention window by using window size change information.

FIG. 23 is a diagram showing a method of determining a user's attention window by using window size change information. Here, a method of determining a user's attention information (window) will be described by taking a window size change as an example out of the window resources. The window used to process information by an individual or between individuals is provided with a window resizing part, and when using the window, the user explicitly changes the display size of the window by using the window resizing part. The window size change detecting part 1726 detects the presence or absence of a change in the window display size, and upon detecting a display size change, notifies the window information management and control part 1731 accordingly. Then, the window information management and control part 1731 performs control by determining that the window whose display size has been changed is the window to which the user's attention is currently directed.

When two or more windows have been determined as attention windows, the most recently resized window may be judged to be the window to which the user's attention is currently directed. A further detailed rule on window sizes may be defined, for example, to determine a window larger than a predetermined size as the attention window.

Furthermore, when the window attention time interval is short (that is, when the window is frequently operated and the attention time interval is shorter than a predetermined time), this may be judged as an erroneous operation on the user side, determining that the window is not an attention window.

In the case of other window resources managed in the window information managing part 1416, an attention window can be determined in a similar manner. For example, the window that the user is currently using to process information can be identified by detecting a window focus change or an inter-window display change.

Figure 24:
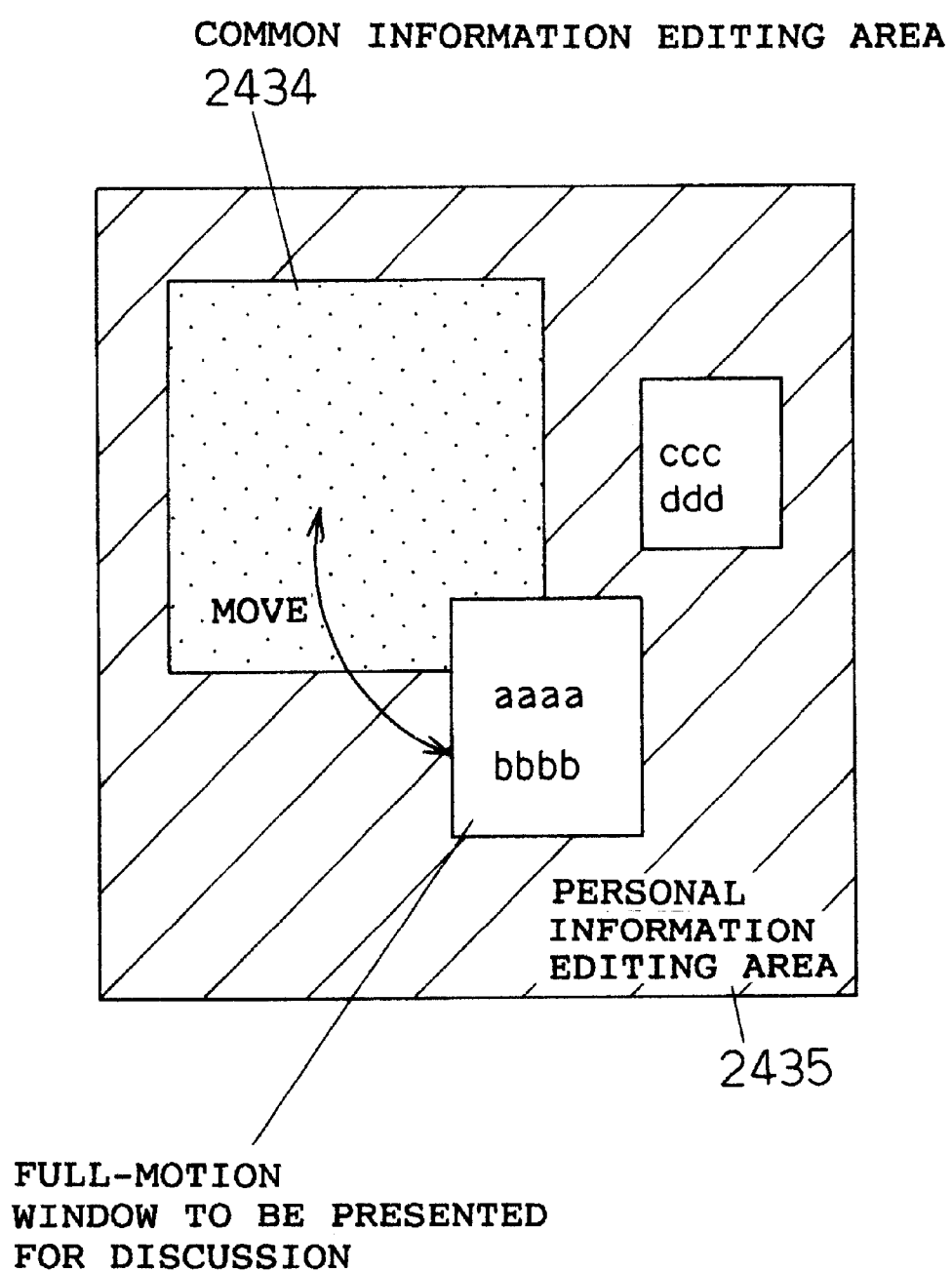
FIG. 24 is a diagram showing a method of determining a user's attention window by using window's owner information.

FIG. 24 is a diagram showing a method of determining a user's attention window by using window's owner information. A common information editing area 2434, as a work area for processing information between individuals, and a personal information editing area 2435, as a work area for processing information by an individual, are provided on a monitor screen. When the user has moved a window that he desires to present to another user (a full-motion window for discussion between them) into the common information editing area 2434, the window display position change detecting part 1727 detects the movement. Then, the window information management and control part 1731 performs communication control to present the window moved into the common information editing area 2434 to that other user.

By predefining an area for common information processing and an area for personal information processing, when the user is working on one or the other of the areas according to the purpose, the window display position change detecting part 1727 can easily detect from which standpoint the user is carrying out the current task.

Figure 25:
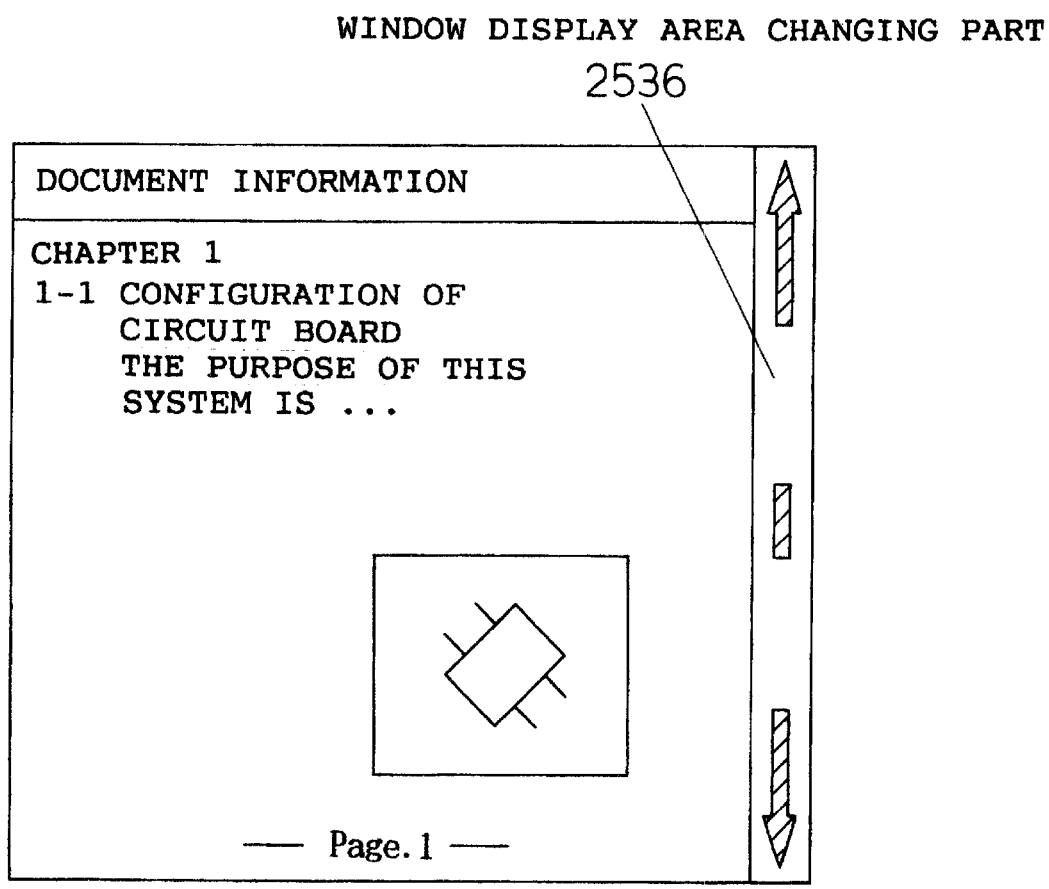
FIG. 25 is a diagram showing a method of determining user's attention information on the basis of information from a window display area change detecting part 1729.

FIG. 25 is a diagram showing a method of determining a user's attention information by using the information from the window display area change detecting part 1729. First, a window for displaying document information is provided with a window display area changing part 2536 so that the user can view a necessary portion of document information as needed when the document contains more information that can fit in the window. However, the user interface is not limited to the scroll bar shown in the figure, but a pushbutton type or the like may be used. The window display area change detecting part 1729 detects whether the user has operated the window display area changing part 2536 to bring a different portion of the document into the window. When the window display area change detecting part 1729 has detected an operation performed on the window display area changing part 2536, the window information management and control part 1731 determines that the window from which the operation has been detected is the window to which the user's attention is currently directed, provided that after that detection, audio information is detected for a predetermined length of time (for example, one second).

This is effective when in explaining a thing a person points to the part of interest and attempts to convey his intention by voice (using words) to the other party.

It has been described that the window information management and control part 1731 determines the attention window, but alternatively, the pointing information managing part 1417 may determine it.

It has also been described that the window information management and control part 1731 determines the attention window on the basis of the detection of an operation performed on the window display area changing part 2536 and the detection of audio information for a predetermined length of time, but alternatively, the determination may be made based on the detection of either one of them.

(4) Pointing Information Managing Part 1417

Figure 18:
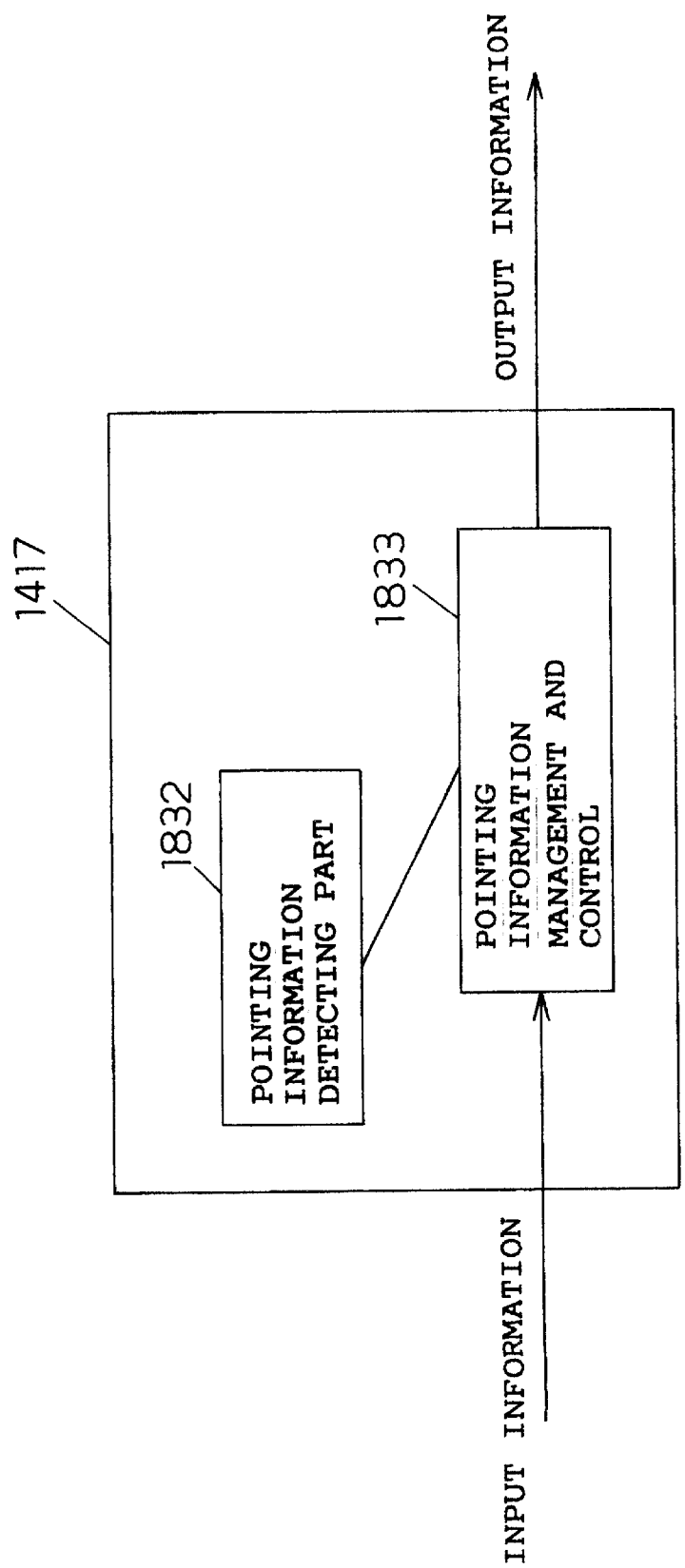
FIG. 18 is a diagram showing the configuration of a pointing information managing part 1417.

FIG. 18 is a diagram showing the configuration of the pointing information management part 1417. The pointing information management part 1417 comprises a pointing information detecting part 1832 for detecting a pointing action of the user (for example, a pointing action using a mouse pointer or the like), and a pointing information management and control part 1833 for controlling and managing this detecting part.

FIG. 22 is a chart showing an example of information managed in the window information managing part 1416 and the pointing information managing part 1417. The window information managing part 1416 and the pointing information managing part 1417 manage information consisting of the content of pointing operation change, the originator of the change, the time and date of the change, and the location of the change. A logical page, chapter, or section may be used as a basic unit for window operation.

Further, a personal information describing means may be provided in a window, and the contents of the personal information descriptions (personal memos) may be examined.

As is apparent from the above description, according to the working condition managing part 1208 (or 1308) provided with the audio information managing part 1415 for managing a change in audio information, the window information managing part 1416, and the pointing information managing part 1417, since the user's pointing action to a full-motion window and the location of a change in audio information can be detected, it is made possible to determine more accurately the period during which the user's attention is directed to the full-motion window. This is because, when a person tries to explain a thing (document), a pointing action to the document occurs simultaneously with the generation of voice. Meticulous control is thus made possible. In this case, to avoid complexity of control, the working condition managing part 1208 (or 1308) need not necessarily be provided with the audio information managing part 1415.

According to the working condition managing part 1208 (or 1308) equipped with the above-described parts, the following judgement operations can be performed automatically.

Figure 26:
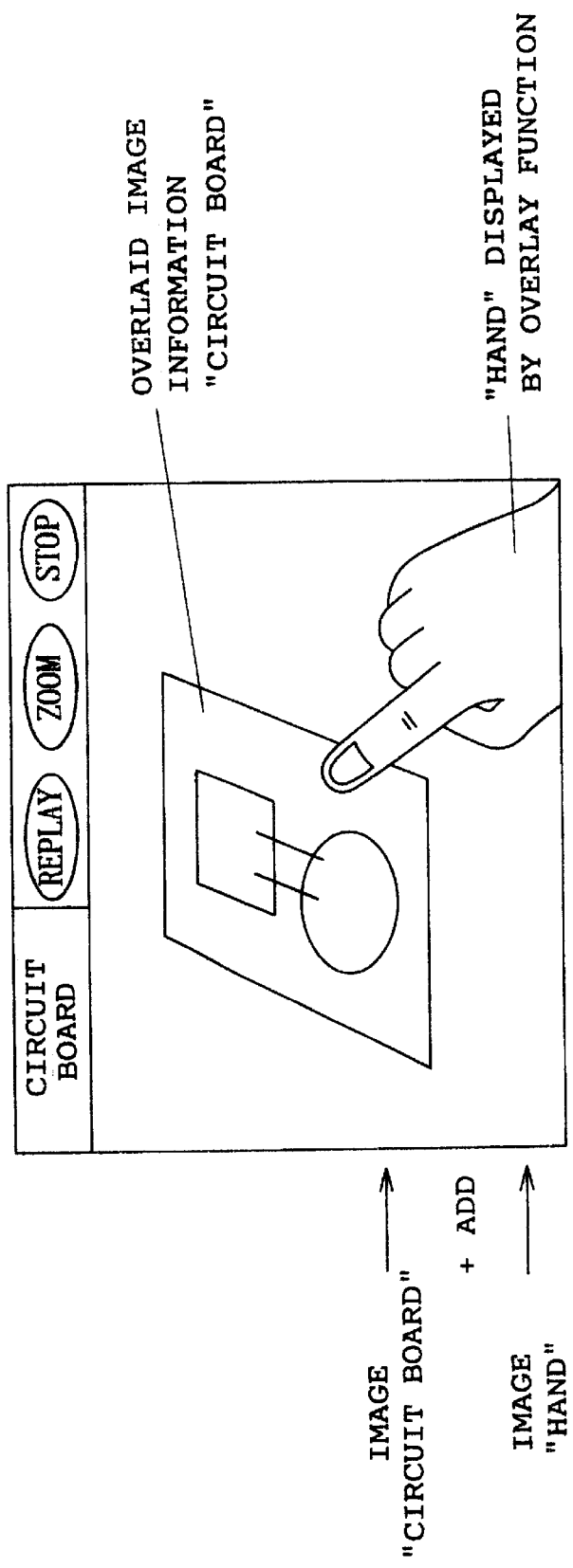
FIG. 26 is a diagram showing a method of detecting a user's attention point in video information.
Figure 27:
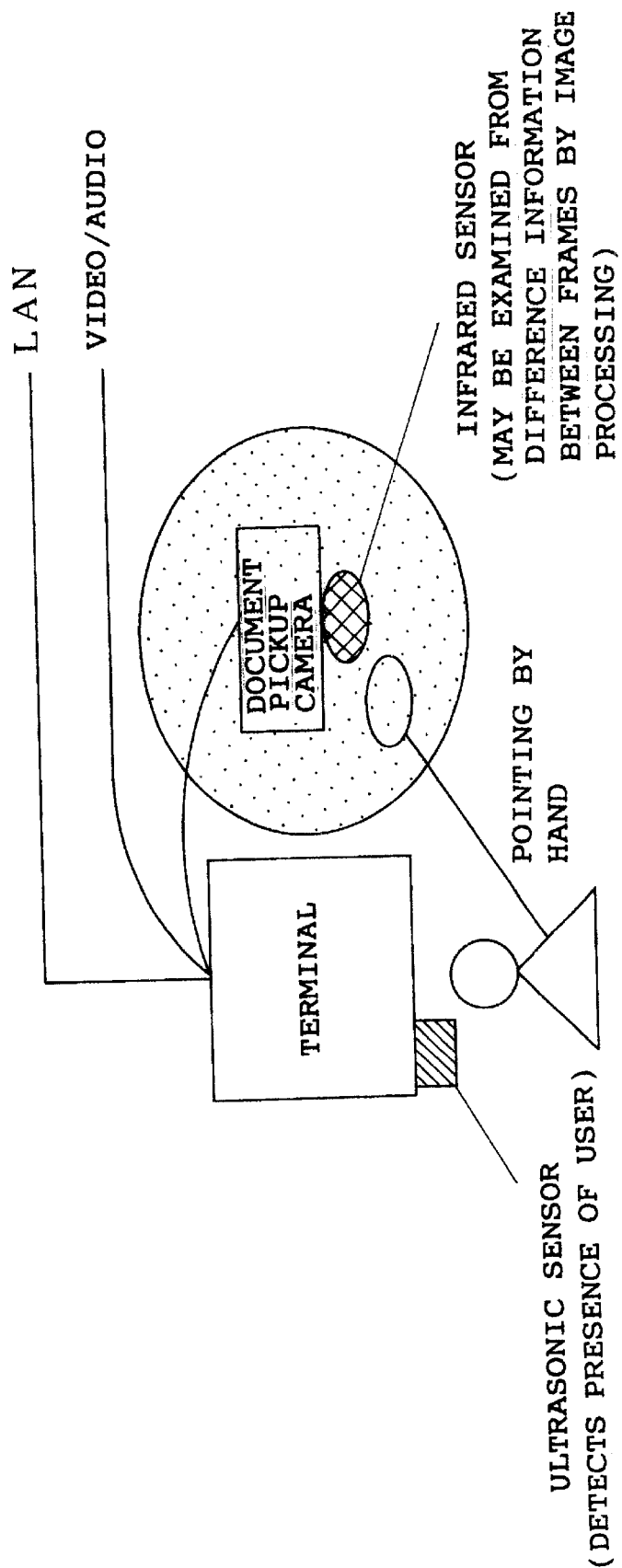
FIG. 27 is a diagram showing the method of detecting a user's attention point in video information.

FIGS. 26 and 27 are diagrams illustrating a method of detecting an object in an image to which the user's attention is directed. The working condition managing part 1208 (or 1308) equipped with a camera for shooting a document or a person detects a camera operation performed by the user and audio information by using the image information managing part 1414 and the audio information managing part 1415, respectively. Camera operations performed by the user include, for example, video channel switching when there are a plurality of video sources, camera zoom operations, and operations on recording apparatus such as VTRs. The working condition managing part 1208 (or 1308) detects an object to which the user's attention is directed, based on when and where in the image information the user has pointed to.

Image resolution or brightness can thus be automatically raised in accordance with the user's pointing action. Further, when a person gives an explanation by pointing to a document, for example, processing is performed to display clearly an area in the vicinity of a place pointed to by him while reducing the resolution of other areas (for example, other areas than the center of a full-motion window); this avoids unnecessarily using computer resources.

FIG. 26 is a diagram showing a monitor screen displaying an image of a "circuit board" that a user presents using a camera for shooting materials, and an image of another user's finger pointing to the "circuit board" image, the "finger" image being overlaid on the "circuit board" image. As shown in FIG. 27, pointing information generated by a pointing finger or the like is detected by an infrared sensor mounted on the camera used to present a document to participants. It is also possible to utilize difference information between image frames.

When the pointing information is detected, the pointing information managing part 1417 performs processing to overlay the detected object (in this example, the pointing finger) onto the "circuit board" displayed on the video monitor.

Since the image of interest can be identified in this way, the working condition managing part 1208 (or 1308) can adjust the image resolution or brightness information.

Figure 28:
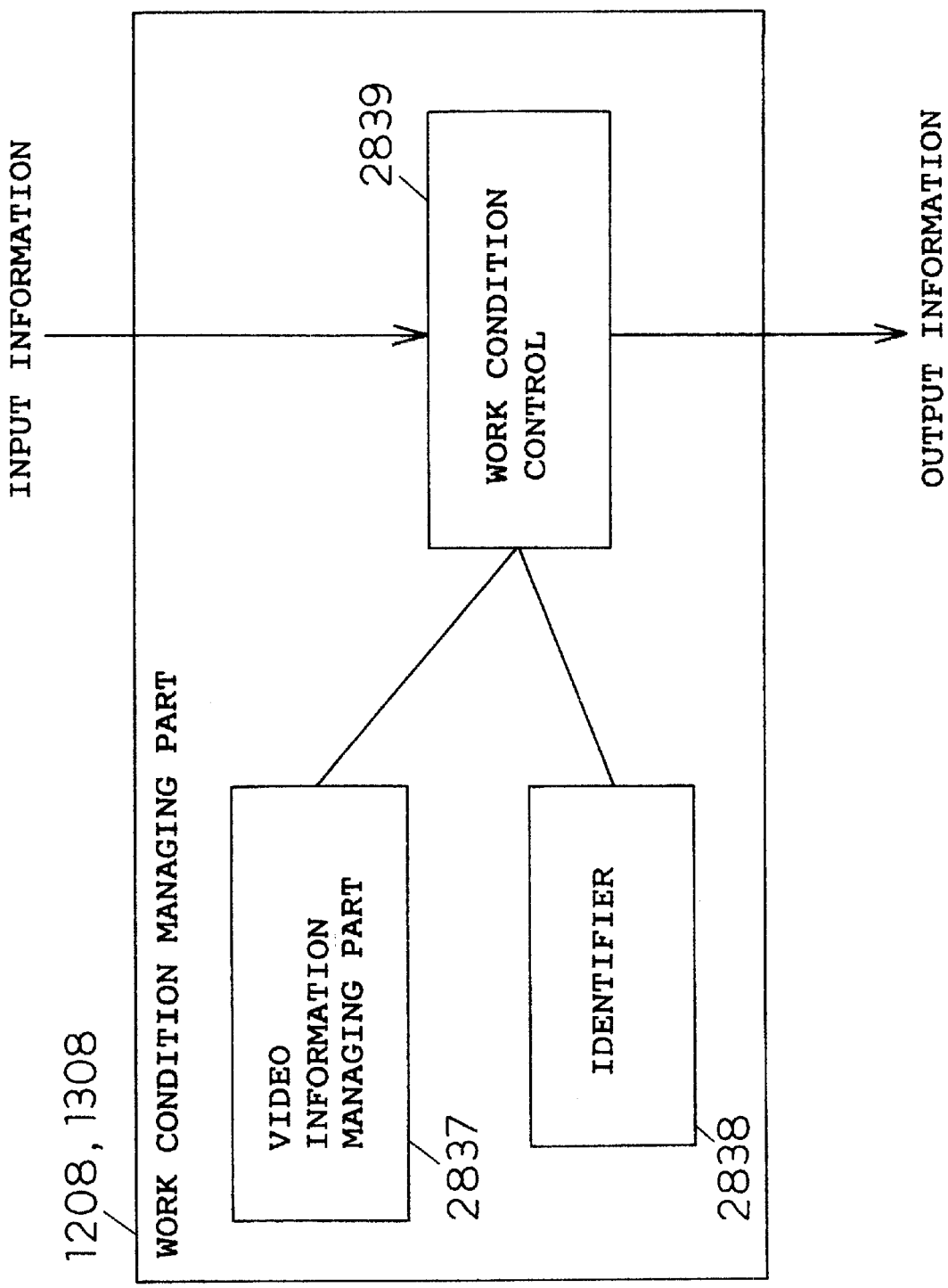
FIG. 28 is a diagram showing the configuration of a working condition managing part 1208 or 1308 equipped with an identifying part.

FIG. 28 shows the working condition managing part 1208 (or 1308) equipped with an identifying part 2838. The working condition managing part 1208 (or 1308) comprises: a video information managing part 2837 for examining a change in video information; the identifying part 2838 for identifying a person or the like that has entered the vicinity of a terminal or a document being presented in a conference; and a working condition control part 2839 for controlling and managing these parts.

Figure 29:
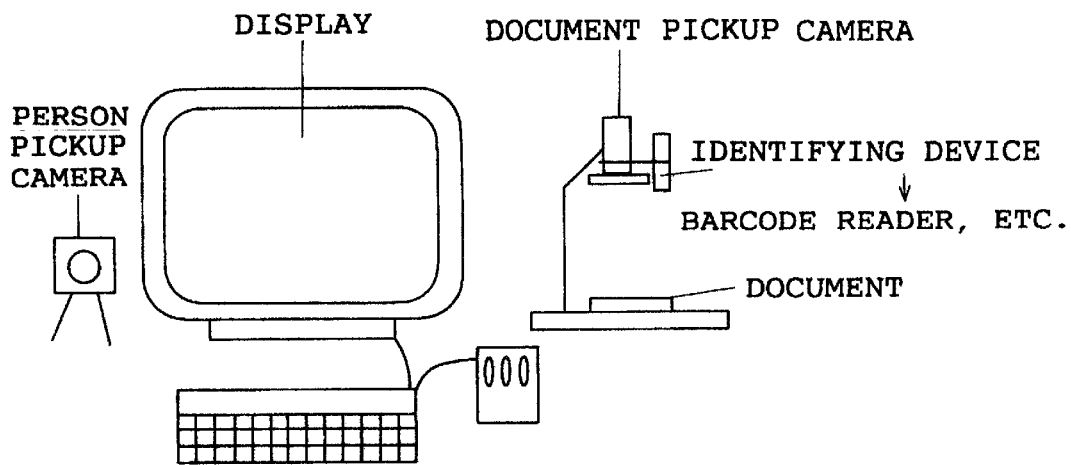
FIG. 29 is a diagram-showing video information adjusting apparatus equipped with an identifying part.
Figure 29:
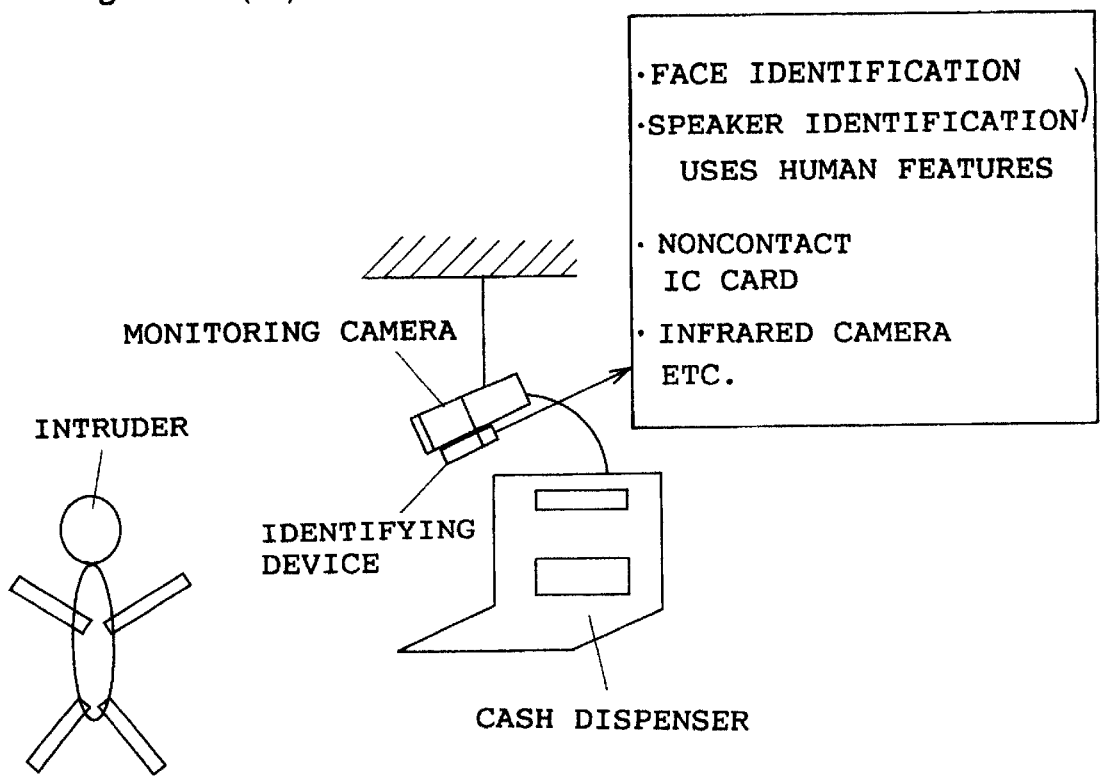

FIG. 29 is a diagram showing video information adjusting apparatus equipped with the identifying part 2838. FIG. 29(*a*) shows a video information adjusting apparatus used when explaining a document using a camera for shooting materials. A barcode reader, for example, may be used as the identifying part 2838. The barcode reader then identifies the document currently being presented.

FIG. 29(*b*) shows a video information adjusting apparatus used when monitoring a cash dispenser or the like using a monitoring camera. Means that can be used as the identifying part 2838 include, for example, face identifying means for detecting human features, speaker identifying means using voice, a noncontacting IC card, and an infrared camera though it can only detect the presence or absence of a human body. The identifying part 2838 detects a person entering the vicinity of the video information adjusting apparatus or a user of the cash dispenser or the like.

In this way, the camera for shooting a target document or person can be controlled, as described so far, and the resolution or brightness can be controlled in accordance with the condition of the target document or person.

The above-described video information adjusting apparatus can be used not only for a multimedia communication terminal designed for a conference in an office or remote education at home, but also for remote monitoring using a network.

Furthermore, the transmission channel is not limited to a wired configuration, but a radio transmission channel, considering the use of a portable computer (for example, a PHS, radio LAN, etc.), may also be used. This makes it possible to apply the video information adjusting apparatus for mobile communication systems such as in vehicles or airplanes. The above-described video information adjusting apparatus can also be applied for multi-location interphone systems.

As described, according to the present invention, video information resolution or brightness is automatically adjusted according to the working condition of a user in a communication system, thereby achieving efficient management of computer resources.

What is claimed is:

1. An image information adjusting apparatus comprising:
 a communications network; and
 a plurality of terminals coupled to the communications network, each terminal including:
 image information acquiring means for separately acquiring image information including at least two different kinds of illuminance information, from an identical shot on the basis of a prescribed imaging condition,
 transmitting means for separately transmitting onto the communications network said at least two kinds of illuminance information,
 receiving means for separately receiving at least two kinds of illuminance information from said communications network, and
 image information generating means for generating brightness-adjusted image information on the basis of a prescribed illuminance range and by using at least one of said at least two kinds of illuminance information transmitted on the communications network.

2. An image information adjusting apparatus according to claim 1, wherein said image information acquiring means acquires standard illuminance information which is image information corresponding to a first illuminance range, and high illuminance information which is image information corresponding to a second illuminance range, the second illuminance range being higher than said first illuminance range.

3. An image information adjusting apparatus according to claim 2, wherein said image information generating means generates expanded image information by adding said high illuminance information to said standard illuminance information and by correcting a high illuminance information portion of the resulting illuminance information, and generates said brightness-adjusted image information by using said expanded image information on the basis of said prescribed illuminance range.

4. An image information adjusting apparatus according to claim 3, said transmitting means including transmitting information concerning said prescribed imaging condition and said prescribed illuminance range, and said receiving means including receiving said information concerning said prescribed imaging condition and said prescribed illuminance range.

5. An image information adjusting apparatus according to claim 4, wherein said image information acquiring means includes a solid-state imaging device for reading separately charged signals resulting from two different kinds of accumulation times.

6. An image information adjusting apparatus comprising
 a plurality of camera means, each camera means obtaining an image with at least two kinds of illuminance information from an identical shot,
 a terminal support apparatus for processing the image from each respective camera means with the at least two kinds of illuminance information,
 a bidirectional communications channel for each camera means, each channel coupled between a respective camera means and the terminal support apparatus, and each channel carrying the image with the at least two kinds of illuminance information from each respective camera means, and the support apparatus terminal including adjusting means of adjusting the image with the at least two kinds of illuminance information received from each camera means, independently of any image received from any other camera means;

each camera means including a transmitter and a receiver, the transmitter sending the at least two different kinds of illuminance information to the terminal support apparatus by way of the bidirectional communications channel, and the receiver receiving adjustment information from the terminal support apparatus by way of the bidirectional communications channel.

7. An image information adjusting apparatus comprising:

a communications network;

a plurality of terminals, each terminal including a camera for acquiring image information of at least two different kinds of illuminance information from an identical shot and a controller for adjusting brightness of the camera;

each terminal including a receiver and a transmitter coupled to the communications network for bidirectional communication on the network;

a first of the terminals transmitting the at least two different kinds of illuminance information to a second of the terminals;

the second terminal generating a brightness-adjustment based on the received two different kinds of illuminance information, and transmitting the brightness-adjustment to the first terminal;

wherein the first terminal adjusts the brightness of the camera based on the brightness-adjustment received from the second terminal.

* * * * *